United States Patent
Nishibata et al.

(10) Patent No.: US 6,903,453 B2
(45) Date of Patent: Jun. 7, 2005

(54) SEMICONDUCTOR INTEGRATED CIRCUIT DEVICE AND DEBUGGER DEVICE FOR THE SAME

(75) Inventors: Motohide Nishibata, Wakayama (JP); Tsutomu Mikami, Kyoto (JP); Atsushi Ubukata, Kyoto (JP); Takio Yamashita, Kyoto (JP); Kouichirou Miyawaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 83 days.

(21) Appl. No.: 10/621,654

(22) Filed: Jul. 18, 2003

(65) Prior Publication Data

US 2004/0019826 A1 Jan. 29, 2004

(30) Foreign Application Priority Data

Jul. 24, 2002 (JP) .................................. 2002-214963

(51) Int. Cl.⁷ .............................................. H01L 23/02
(52) U.S. Cl. ...................................... 257/686; 257/777
(58) Field of Search .............................. 257/678, 685, 257/686, 734, 777

(56) References Cited

U.S. PATENT DOCUMENTS

| | | | |
|---|---|---|---|
| 6,356,960 B1 | 3/2002 | Jones et al. | |
| 6,526,501 B2 * | 2/2003 | Edwards et al. | 712/227 |
| 6,697,931 B1 * | 2/2004 | Jones et al. | 712/38 |
| 2002/0091494 A1 * | 7/2002 | Kudo | 702/119 |

* cited by examiner

Primary Examiner—Nathan J. Flynn
Assistant Examiner—Leonardo Andujar
(74) Attorney, Agent, or Firm—McDermott Will & Emery LLP

(57) ABSTRACT

A semiconductor integrated circuit device includes: a first semiconductor chip including a CPU and a debug basic circuit section for verifying operation of a program executed by the CPU; and a second semiconductor chip retained over a principal surface of the first semiconductor chip and including a debug extension circuit section electrically connected to the CPU and the debug basic circuit section. The debug basic circuit section includes a debug command analyzing section for analyzing a command input from outside. The debug extension circuit section formed in the second semiconductor chip includes a debugging function circuit section including at least one debug circuit.

11 Claims, 17 Drawing Sheets

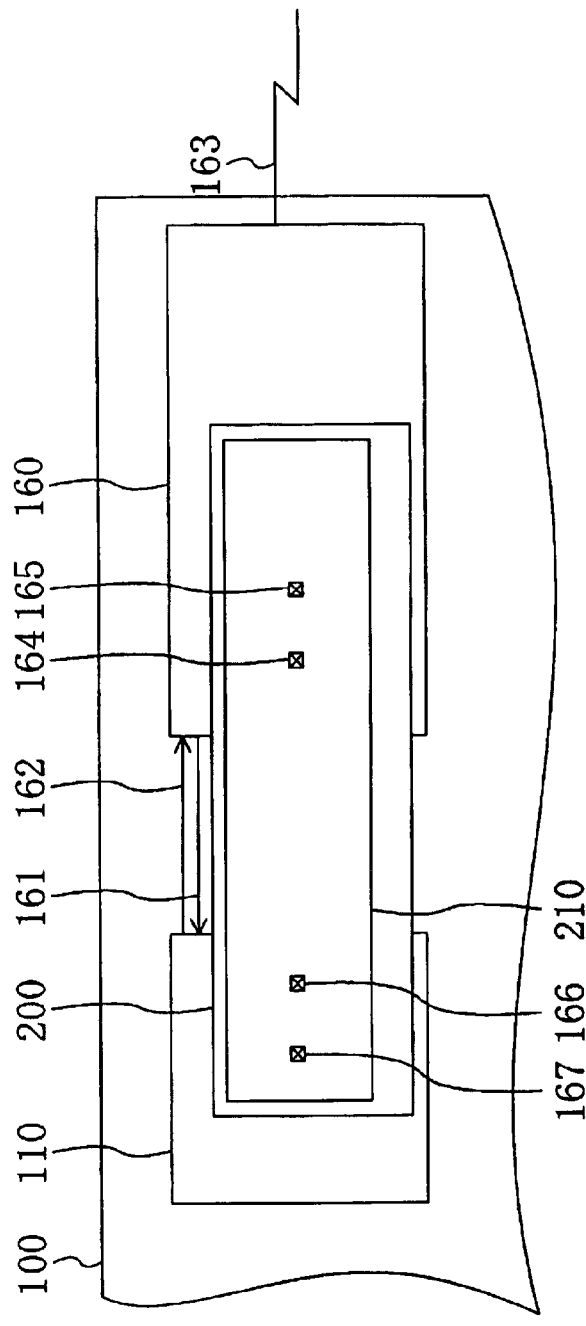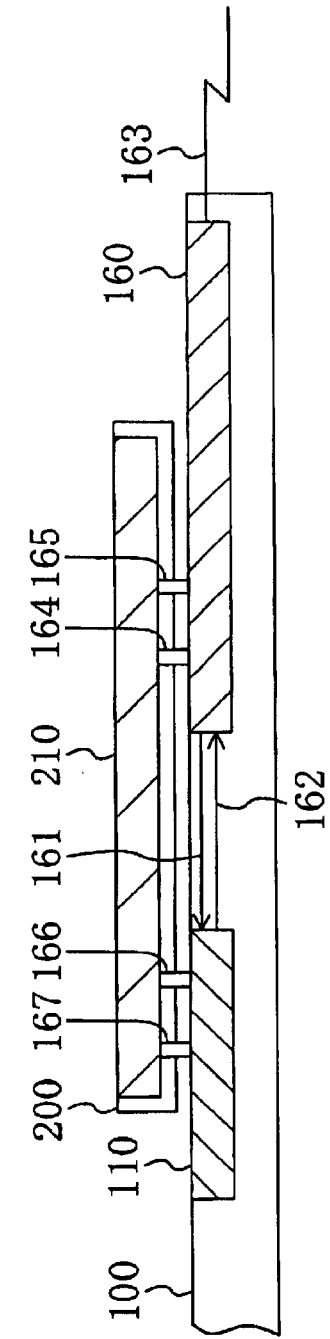
FIG. 2A
FIG. 2B

FIG. 6

| | BASIC FUNCTION | WATCH POINT | TRACE | TIMER | TRIGGER | CACHE INFORMATION |
|---|---|---|---|---|---|---|
| DEBUGGING FUNCTION 1 | ○ | | | | | |
| DEBUGGING FUNCTION 2 | ○ | WATCH POINT CIRCUIT A | | | | |
| DEBUGGING FUNCTION 3 | ○ | | TRACE CIRCUIT A | | | |
| DEBUGGING FUNCTION 4 | ○ | | | TIMER CIRCUIT A | | |
| DEBUGGING FUNCTION 5 | ○ | | TRACE CIRCUIT B | | | |
| DEBUGGING FUNCTION 6 | ○ | WATCH POINT CIRCUIT A | TRACE CIRCUIT A | TIMER CIRCUIT B | | |
| DEBUGGING FUNCTION 7 | ○ | | | | TRIGGER CIRCUIT A | |
| ... | ... | ... | ... | ... | ... | ... |
| DEBUGGING FUNCTION n | ○ | WATCH POINT CIRCUIT B | TRACE CIRCUIT A | TIMER CIRCUIT C | TRIGGER CIRCUIT B | CACHE INFORMATION CIRCUIT C |
| ... | ... | ... | ... | ... | ... | ... |

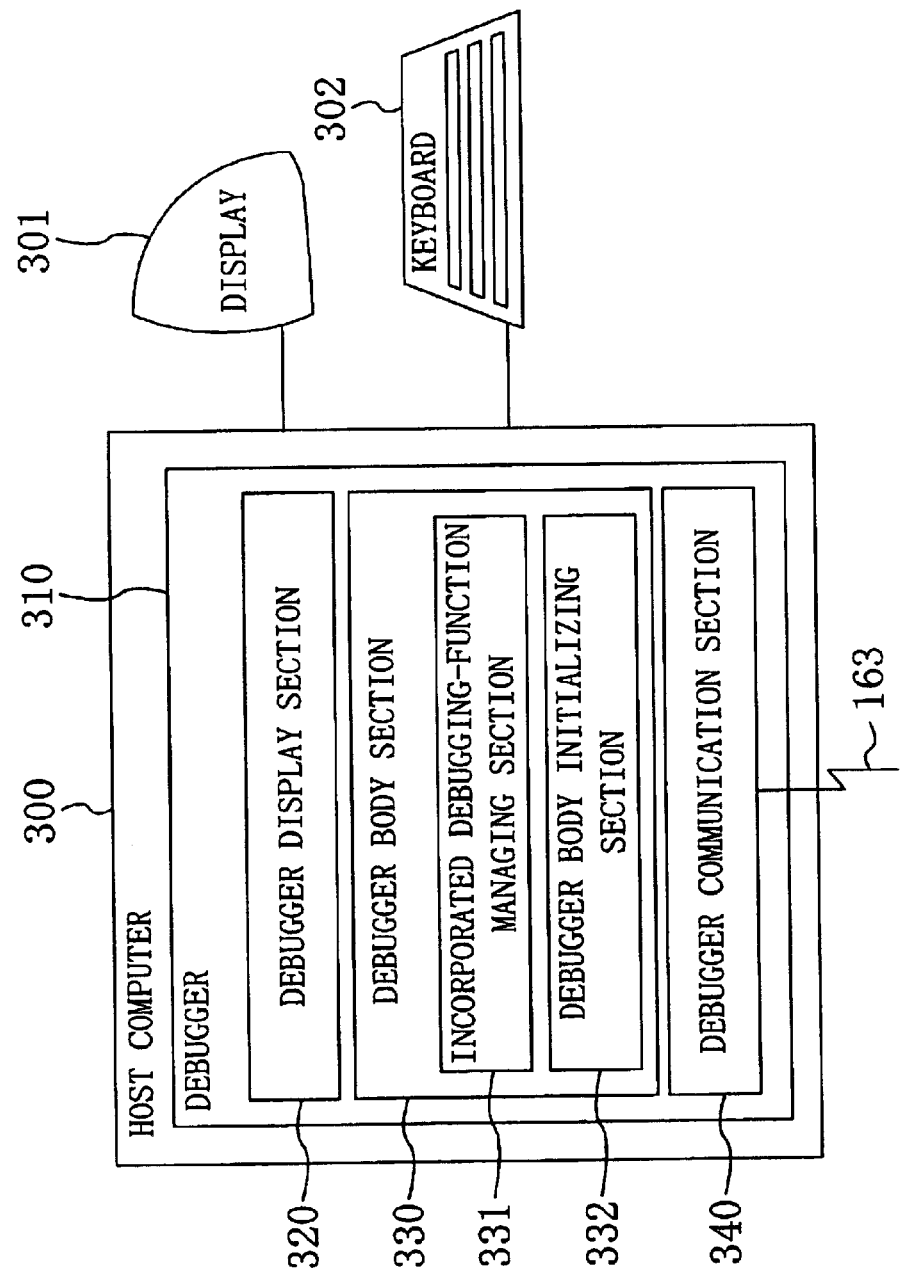

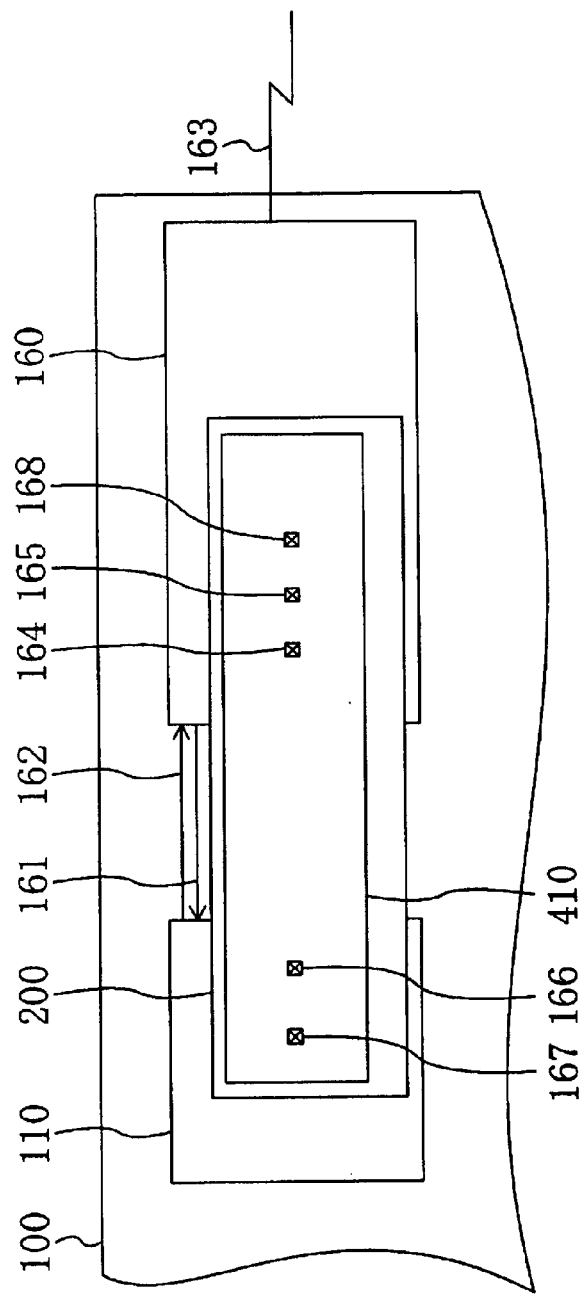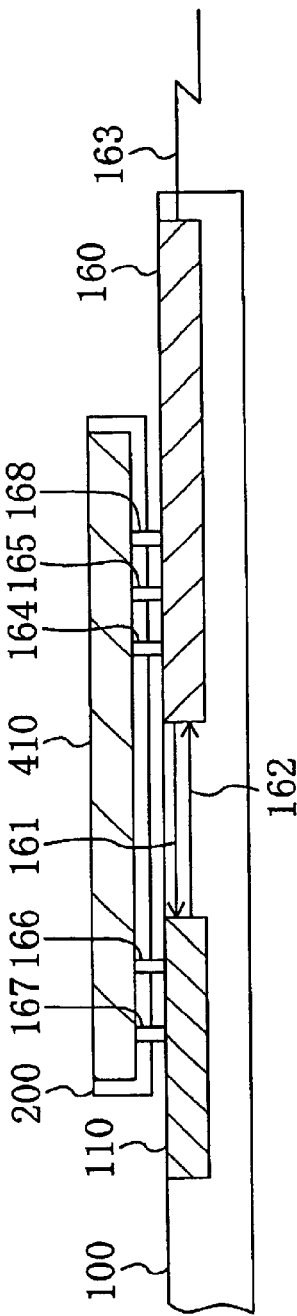
FIG. 9A
FIG. 9B

SEMICONDUCTOR INTEGRATED CIRCUIT DEVICE AND DEBUGGER DEVICE FOR THE SAME

BACKGROUND OF THE INVENTION

The present invention relates to semiconductor integrated circuit devices including microcomputers or microprocessors and incorporating debug circuits for verifying operation of programs executed by CPUs, and to debugger devices for debugging the programs.

Conventionally, in-circuit emulators (ICEs), instruction level software simulators, monitors or the like have been used to develop software programs (hereinafter, simply referred to as programs) executed by processors such as microcomputers embedded in, for example, household electrical appliances and to verify operation of the programs. The ICEs are a debugging tool unique to microcomputers or microprocessors. The instruction level software simulators are a technique for representing, on a host computer, for example, the same simulated executing status as that on a microcomputer or microprocessor by executing (simulating), on the host computer, a program to be developed executed on the microcomputer or microprocessor. The monitors are a technique for debugging a program executed on a microcomputer or microprocessor by incorporating a monitoring program for execution control or monitoring into the program in advance so as to monitor the program executed on the microcomputer or microprocessor and then by operating the monitoring program from the host computer after the completion of the microcomputer or microprocessor.

With respect to the conventional ICEs, target programs are developed and debugged by preparing an evaluation board for development and by installing special hardware, instead of a processor otherwise placed on the evaluation board. However, household electrical appliances become miniaturized and debugging is more frequently performed in the same program operating environment as that for final products in recent years, so that it is more and more difficult to install special hardware such as ICEs. In addition, since the ICEs are a tool used exclusively for debugging, they operate under different operational conditions from those for final products in some cases. As a result, the final products more often suffer from operational troubles in programs which do not occur in operation of the ICEs.

To solve these problems, for the purpose of developing a program and verifying operation thereof in the same operating environment as that for an actual product, an on-chip debugging environment in which a debug circuit is incorporated into a processor in advance and the program is debugged using the incorporated debug circuit has been developed recently.

Accordingly, since the on-chip debugging environment utilizes the debug circuit incorporated in advance, operation of the program can be analyzed in the actual product even if an operational trouble occurs in the program after the completion of the product as well as during the development thereof.

However, the known on-chip debugging environment has various types of debugging functions, but once which processor is to be a target is determined, only limited types of debugging functions can be incorporated into the processor. As a result, if a debugging function that a program developer needs is not incorporated, there arises a problem that the debugging must be conducted by an alternative means.

In addition, debugging functions needed in general differ between the initial stage and the final stage in the course of development of a program. Therefore, if the debugging functions are limited, there arises another problem of insufficiently meeting the demand of the program developer.

If all the debugging functions are incorporated into a processor to solve the problem, the circuit scale of the incorporated debug circuits is increased, resulting in hindering downsizing of a semiconductor chip including the processor.

SUMMARY OF THE INVENTION

It is therefore an object of the present invention to effectively utilize a plurality of debugging functions while establishing a debugging environment in accordance with a process for developing a program, even for a debug circuit incorporated into a microcomputer chip or microprocessor chip.

In order to achieve this object, according to the present invention, a semiconductor integrated circuit device is constituted by a first semiconductor chip including a CPU core and a first debug circuit and a second debug circuit which is retained over the first semiconductor chip and includes at least one debugging function.

Specifically, a first inventive semiconductor integrated circuit device includes: a first semiconductor chip including a memory section, input/output sections, a CPU core and a first debug circuit section for verifying operation of a program executed by the CPU core; and a second semiconductor chip retained over a principal surface of the first semiconductor chip and including a second debug circuit section electrically connected to the CPU core and the first debug circuit section. The first debug circuit section includes a command analyzing section for analyzing a debug command input from outside, a first transmitting/receiving section for, if the analyzed command is a command to be executed by the CPU core, transmitting the command to the CPU core and receiving an execution result of the command from the CPU core, and a second transmitting/receiving section for, if the analyzed command is a command to be executed by the second debug circuit section, transmitting the command to the second debug circuit section and receiving an execution result of the command from the second debug circuit. The second debug circuit section includes a debugging function circuit.

In the first inventive semiconductor integrated circuit device, the second debug circuit section in the second semiconductor chip, which is separate from the first semiconductor chip and retained over the first semiconductor chip, can be made to include a plurality of debugging functions. Accordingly, even if all the debug functions necessary for debugging the second semiconductor chip are incorporated therein, the circuit scale of the first semiconductor chip do not increase. As a result, even a debug circuit incorporated into a microcomputer or microprocessor can more effectively utilize a plurality of debugging functions, as well as a debugging environment can be established in accordance with a process for developing a program.

A second inventive semiconductor integrated circuit device includes: a first semiconductor chip including a memory section, input/output sections, a first CPU core, a first debug circuit section for verifying operation of a program executed by the first CPU core, a second CPU core, and a second debug circuit section for verifying operation of a program executed by the second CPU core; a second semiconductor chip retained over a principal surface of the first semiconductor chip and including a third debug circuit section electrically connected to the first CPU core and the first debug circuit section; a third semiconductor chip retained over the principal surface of the first semiconductor chip and including a fourth debug circuit section electrically connected to the second CPU core and the second debug circuit section; and a command switching section for switching a debug command input from outside, between the first debug circuit section and the second debug circuit section. The first debug circuit section includes a command analyzing section for analyzing the debug command input through the command switching section, a first transmitting/receiving section for, if the analyzed command is a command to be executed by the first CPU core, transmitting the command to the first CPU core and receiving an execution result of the command from the first CPU core, and a second transmitting/receiving section for, if the analyzed command is a command to be executed by the third debug circuit section, transmitting the command to the third debug circuit section and receiving an execution result of the command from the third debug circuit. The second debug circuit section includes a command analyzing section for analyzing the debug command input through the command switching section, a third transmitting/receiving section for, if the analyzed command is a command to be executed by the second CPU core, transmitting the command to the second CPU core and receiving an execution result of the command from the second CPU core, and a fourth transmitting/receiving section for, if the analyzed command is a command to be executed by the fourth debug circuit section, transmitting the command to the fourth debug circuit section and receiving an execution result of the command from the fourth debug circuit. Each of the third and fourth debug circuit sections includes a debugging function circuit.

In the second inventive semiconductor integrated circuit device, the same advantage as that obtained in the first inventive semiconductor integrated circuit device is obtained. In addition, even when a plurality of CPU cores are provided in the first semiconductor chip, the second and third semiconductor chips, which are retained over the first semiconductor chip and correspond to the respective CPU cores, allow debugging functions for programs to be selected and incorporated, corresponding to the respective CPU cores.

In the first or second inventive semiconductor integrated circuit device, the debugging function circuit preferably includes at least one of a watch point circuit, a trace circuit, a timer circuit, a trigger circuit and a cache information circuit, and is configured by selecting said one circuit from a plurality of circuits having a single function and mutually differing in scale and configuration.

In the first or second inventive semiconductor integrated circuit device, the debugging function circuit is preferably a rewritable hardware circuit.

Then, the debugging function incorporated into the second debug circuit section in the second semiconductor chip can be selectively constructed in accordance with the development status of a program. Accordingly, the program can be debugged more effectively.

An inventive debugger device is a debugger device issuing an instruction to first and second debug circuit sections in a semiconductor integrated circuit device which includes a first semiconductor chip including a memory section, input/output sections, a CPU core and the first debug circuit section and a second semiconductor chip retained over a principal surface of the first semiconductor chip and including the second debug circuit section, the first debug circuit section verifying operation of a program executed by the CPU core, the second debug circuit section being electrically connected to the CPU core and the first debug circuit section. The inventive debugger device includes: an incorporated debugging-function managing section for identifying a debugging function held in the second debug circuit section; and a debugger body initializing section for initializing the debugger device based on the identified debugging function.

The inventive debugger device is a debugger device with a program for debugging the inventive semiconductor integrated circuit device. The debugger device includes an incorporated debugging-function managing section for identifying a debugging function held in the second debug circuit section in the second semiconductor chip, and a debugger body initializing section for initializing the debugger device based on the identified debugging function. Accordingly, even if the debugging function incorporated into the second debug circuit section is not fixed unlike the known device and differs between the respective semiconductor chips, the inventive debugger device can execute a debugging operation as intended using the debugging function incorporated into the second debug circuit section in the second semiconductor chip.

In the inventive debugger device, it is preferable that the second semiconductor chip in the semiconductor integrated circuit device includes a rewritable hardware circuit, and the debugger device preferably includes: a hardware information managing section for managing information on the hardware circuit; a debugging function construction judging section for judging at least one debugging function included in the hardware circuit whether or not said at least one debugging function is incorporable; and a debugging function constructing section for constructing, in the hardware circuit, a debugging function judged to be incorporable by the debugging function construction judging section.

Then, the debugging function incorporated into the second debug circuit in the second semiconductor chip can be selectively constructed in accordance with the development status of a program. Accordingly, the program can be debugged more effectively.

In this case, the debugging function constructing section preferably selects one circuit from among a plurality of hardware circuits created as circuit data beforehand.

Then, a hardware circuit can be constructed on the second debug circuit section for a shorter time, thus reducing the time period required for starting the debugger device.

In this case, the inventive debugger device preferably further includes a debug-setting-information managing section for storing the debug information set in the hardware circuit, and it is also preferable that the debug-setting-information managing section cancels the debugging information set in the hardware circuit and then resets, to the hardware circuit, the debugging information stored in the debug-setting-information managing section.

Then, the configuration of the debugging function usable during debugging of a program can be altered using the debugger device, so that the program can be debugged more effectively.

In this case, it is preferable that the debugging function constructing section includes a debugging function information managing section for holding a plurality of debugging functions, and the hardware information managing section holds a plurality of pieces of hardware circuit information.

Then, even in a semiconductor integrated circuit device having a plurality of CPU cores, debugging environments suitable for the respective CPU cores can be established.

BRIEF DESCRIPTION OF THE DRAWINGS

FIG. 2A is an enlarged plan view schematically showing a portion of a first semiconductor chip including a CPU and a debug basic circuit section and a second semiconductor chip in the semiconductor integrated circuit device of the first embodiment.

FIG. 2B is a cross-sectional view schematically showing the structure shown in FIG. 2A.

FIG. 6 is a table showing combinations of debug circuits incorporable into a debugging function circuit, based on the FIGS. 5A through 5E.

FIG. 7 is a block diagram showing a debugger device according to the first embodiment.

FIG. 9A is an enlarged plan view schematically showing a portion of a first semiconductor chip including a CPU and a debug basic circuit section and a second semiconductor chip in a semiconductor integrated circuit device according to a second embodiment of the present invention. FIG. 9B is a cross-sectional view schematically showing the structure shown in FIG. 9A.

DESCRIPTION OF THE PREFERRED EMBODIMENTS

Embodiment 1

A first embodiment of the present invention will be described with reference to the drawings.

Figure 1:
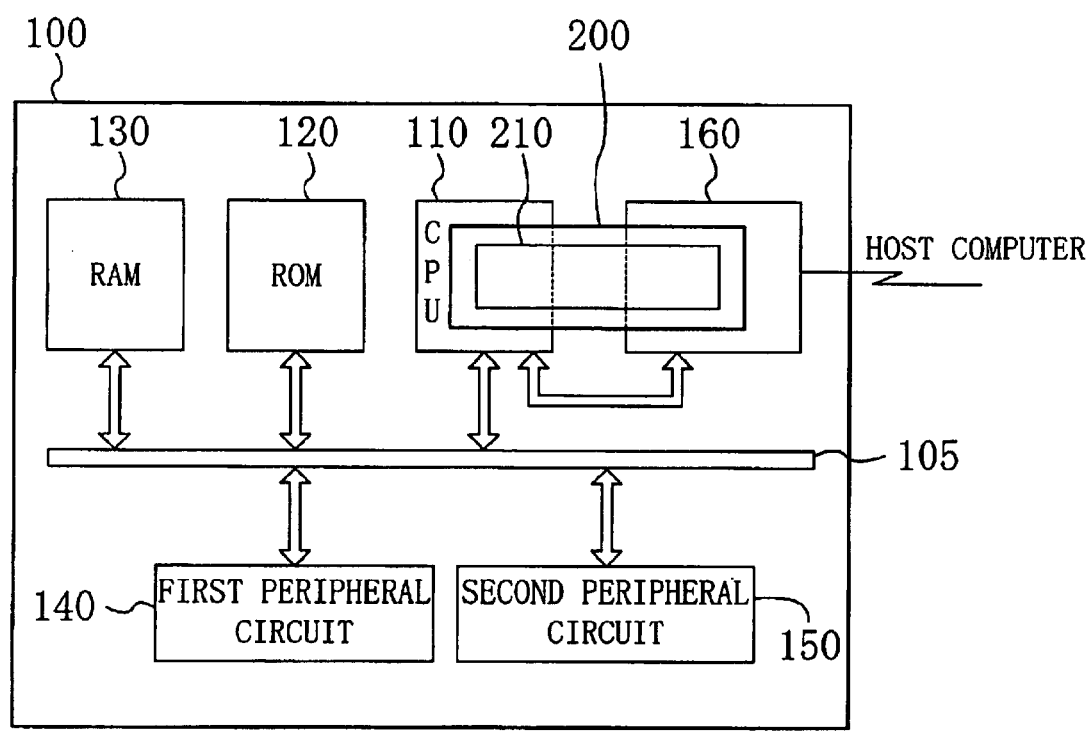
FIG. 1 is a block diagram showing a semiconductor integrated circuit device according to a first embodiment of the present invention.

FIG. 1 is a block diagram showing a semiconductor integrated circuit device according to the first embodiment.

As shown in FIG. 1, in a first semiconductor chip 100 which is a microcomputer chip, a CPU 110; a ROM section 120 which is a read-only memory for storing a program executed by the CPU 110; a RAM section 130 which is a rewritable memory; and first and second peripheral circuits 140 and 150 including input/output circuits, for example, are arranged to be respectively connected to a bus 105 which is a common signal line.

A debug basic circuit section 160 for verifying operation of the program executed by the CPU 110 is disposed to be connected to the CPU 110 and a host computer (not shown), equipped with a debugger which is software for debugging, via respective signal lines. It should be noted that the configuration of the first semiconductor chip 100 shown in FIG. 1 is an example and the present invention is not limited to this configuration.

The first embodiment is characterized in that a second semiconductor chip 200 provided with a debug extension circuit section 210 having at least one debugging function is retained over the principal surface of the first semiconductor chip 100 in a chip-on-chip manner, for example, so as to cover the CPU 110 and the debug basic circuit section 160.

FIG. 2A shows a portion of the first semiconductor chip 100 including the CPU 110 and the debug basic circuit section 160 and the second semiconductor chip 200 in an enlarged manner. FIG. 2B shows a cross-sectional structure of the structure shown in FIG. 2A.

As shown in FIGS. 2A and 2B, in the first semiconductor chip 100, the CPU 110 and the debug basic circuit section 160 are connected to each other via a notification signal line 161 for notifying the CPU 110 of an instruction from the debug basic circuit section 160 and a reception signal line 162 for receiving program execution information and an execution result of the instruction from the CPU 110.

The debug basic circuit 160 is also connected to the host computer (not shown) via a debugger instruction notification signal line 163. The debug basic circuit 160 receives an instruction from the connected host computer and notifies the host computer of a result of execution of the instruction.

The debug basic circuit 160 and the debug extension circuit section 210 are connected to each other via a notification signal line 164 for notifying the debug extension circuit section of setting information and a reception signal line 165 for receiving a result from the debug extension circuit section. If the instruction received from the host computer is an instruction to the debug extension circuit section 210, the debug basic circuit 160 sends the received instruction to the debug extension circuit section 210 through the notification signal line 164 and receives the execution result thereof through the reception signal line 165.

The debug extension circuit section 210 and the CPU 110 are connected to each other via an address information signal line 166 and an operand information signal line 167. The debug extension circuit section 210 receives necessary execution address information from the CPU 110 through the address information signal line 166. The debug extension circuit section 210 receives execution operand information of data contained in the instruction or address information from the CPU 110 through the operand information signal line 167.

The notification signal line 161, the reception signal line 162, the notification signal line 164, the reception signal line 165, the address information signal line 166, and the operand information signal line 167 are made of parallel signal lines capable of transferring 8-bit or 16-bit data, for example.

Figure 3:
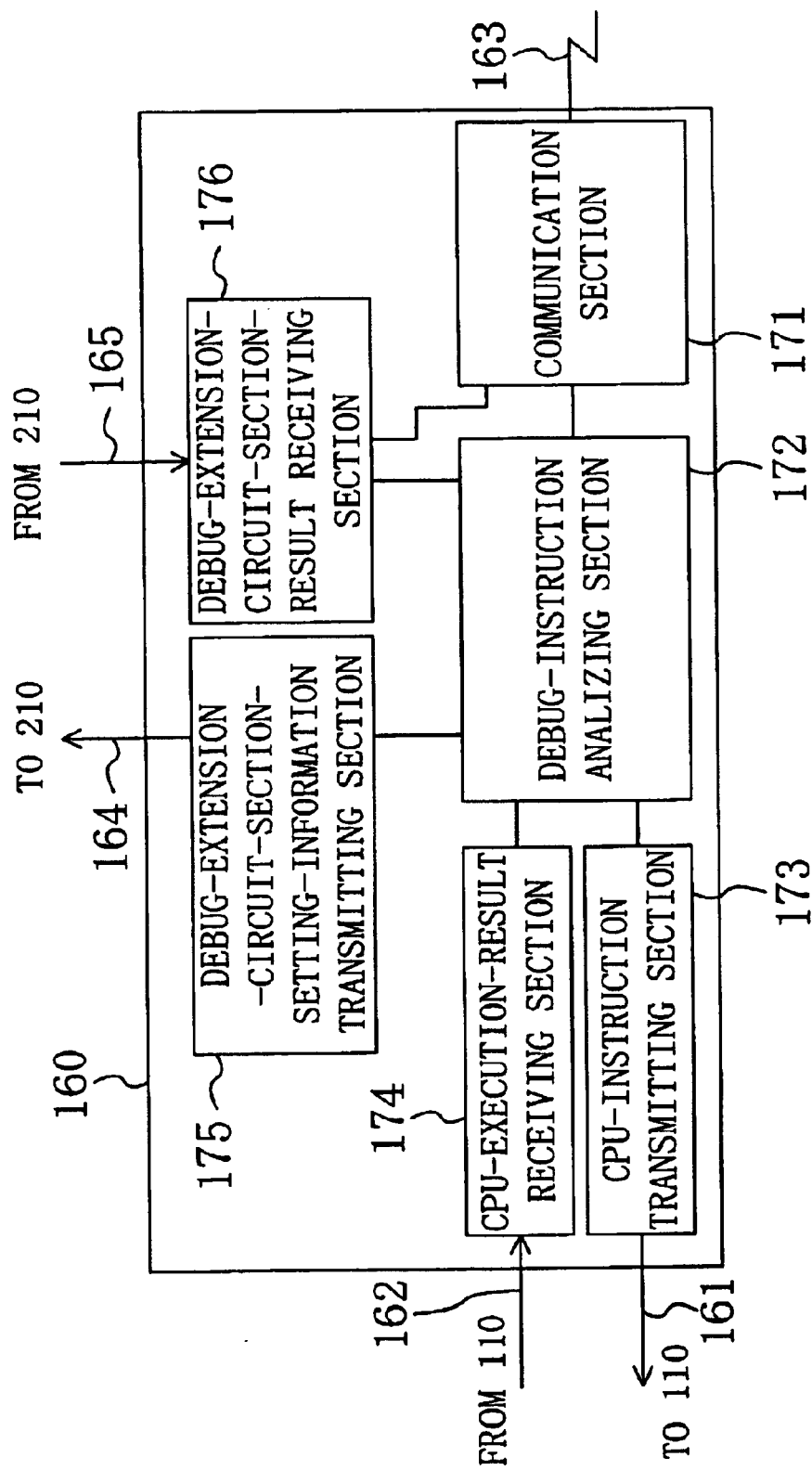
FIG. 3 is a block circuit diagram showing an example of the debug basic circuit section in the semiconductor integrated circuit device of the first embodiment.

FIG. 3 shows an example of a detailed configuration of the debug basic circuit section 160 according to the first embodiment.

As shown in FIG. 3, the debug basic circuit section 160 is constituted by: a communication section 171; a debug-instruction analyzing section 172; a CPU-instruction transmitting section 173; a CPU-execution-result receiving section 174; a debug-extension-circuit-section-setting-information transmitting section 175; and a debug-extension-circuit-section-result receiving section 176.

The communication section 171 controls communication with the host computer. The debug-instruction analyzing section 172 analyzes the instruction received by the communication section 171 and transmits an instruction to the CPU-instruction transmitting section 173 or the debug-extension-circuit-section-setting-information transmitting section 175 in accordance with the result of analysis of the instruction.

The CPU-instruction transmitting section 173 transmits the instruction received from the debug-instruction analyzing section 172 to the CPU 110 through the notification signal line 161. The CPU-execution-result receiving section 174 receives an execution result of the instruction from the CPU 110 and the respective contents of the ROM section 120, the RAM section 130 and resistors, through the reception signal line 162.

The debug-extension-circuit-section-setting-information transmitting section 175 transmits an instruction (debug setting information) received from the debug-instruction analyzing section 172 to the debug extension circuit section 210 through the notification signal line 164. The debug-extension-circuit-section-result receiving section 176 receives an execution result of an instruction set in the debug extension circuit section 210 through the reception signal line 165.

Figure 4:
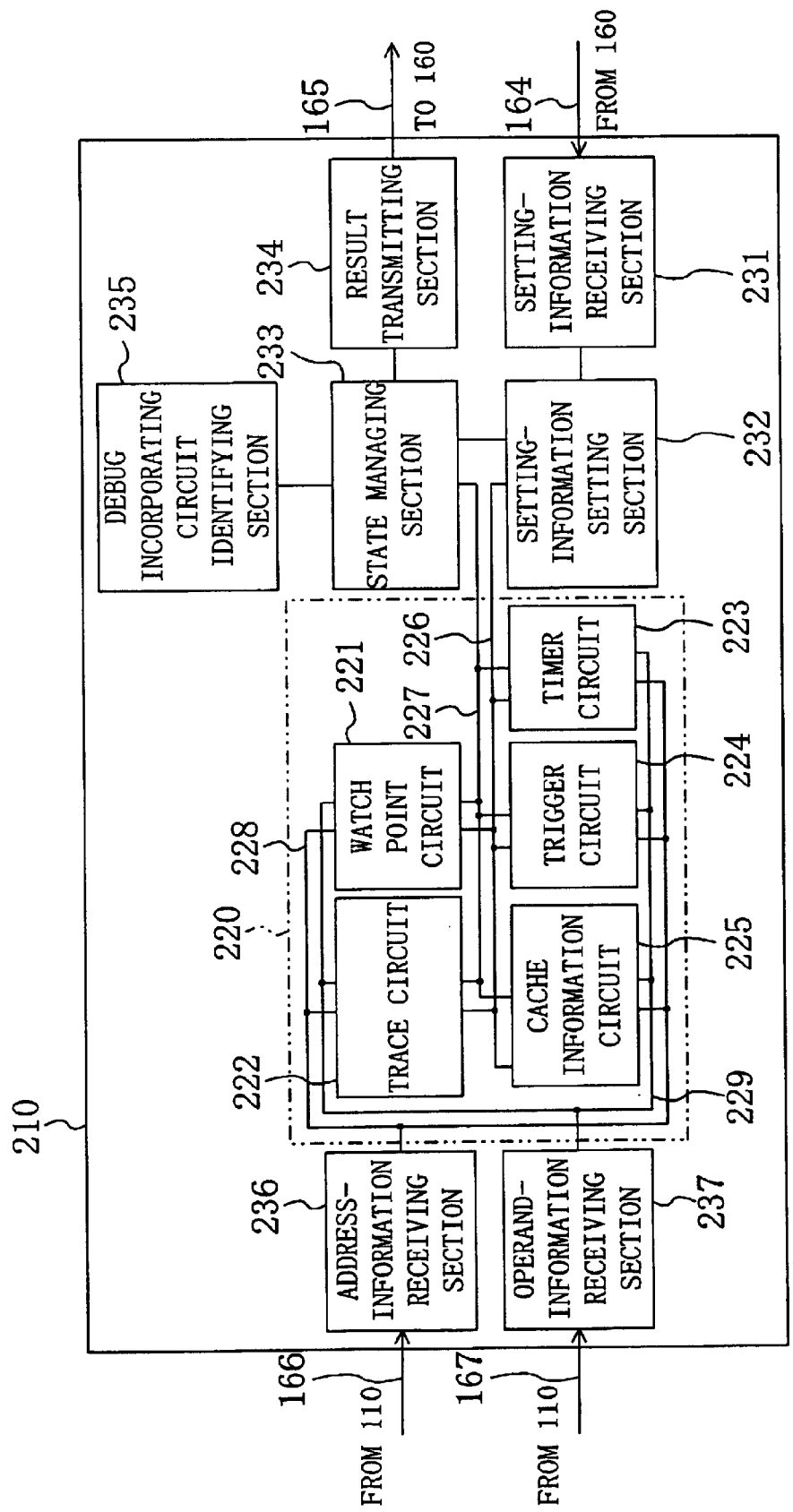
FIG. 4 is a block circuit diagram showing an example of a debug extension circuit section in the semiconductor integrated circuit device of the first embodiment.

FIG. 4 shows an example of a detailed configuration of the debug extension circuit section 210 according to the first embodiment.

As shown in FIG. 4, the debug extension circuit section 210 has a debugging function circuit section 220 including a plurality of debug circuits having mutually different functions. In this case, the debugging function circuit section 220 is assumed to include: a watch point circuit 221; a trace circuit 222; a timer circuit 223; a trigger circuit 224; and a cache information circuit 225.

As well known in the art, the watch point circuit 221 monitors a breakpoint in a program set by an instruction and the occurrence of an event and notifies thereof. The trace circuit 222 stores the execution content and execution result of the program in the CPU 110. The timer circuit 223 controls run time information of the program in the CPU 110. Although not shown, the trigger circuit 224 monitors a trigger input from the outside and a trigger output to the outside. The cache information circuit 225 is effective in the case where a cache memory is installed in the CPU 110, and monitors use conditions or hit rates of the cache memory in the CPU 110.

The setting-information receiving section 231 is notified of an instruction to the debugging function circuit section 220 and of the setting information on debugging through the notification signal line 164.

A setting-information setting section 232 analyzes the instruction and the setting information received by the setting-information receiving section 231, and respectively notifies the watch point circuit 221, the trace circuit 222, the timer circuit 223, the trigger circuit 224 and the cache information circuit 225 of the analyzed setting information through a setting information notification signal line 226.

A state managing section 233 monitors the execution state of the debugging function circuit section 220 through a result notification signal line 227.

A result transmitting section 234 notifies the debug basic circuit section 160 of an execution result of the debugging function circuit section 220 through the reception signal line 165.

The first embodiment is characterized by including a debug incorporating circuit identifying section 235 for allowing the host computer to identify respective functions of the debug circuits incorporated into the debugging function circuit section 220. In this embodiment, the debug incorporating circuit identifying section 235 holds the identification information for identifying the watch point circuit 221, the trace circuit 222, the timer circuit 223, the trigger circuit 224 and the cache information circuit 225.

The debug extension circuit section 210 further includes an address-information receiving section 236 and an operand-information receiving section 237. The address-information receiving section 236 receives necessary address information through the address information signal line 166 and notifies the respective debug circuits in the debugging function circuit section 220 of the address information through an address information notification signal line 228. The operand-information receiving section 237 receives necessary operand information through the operand information signal line 167 and notifies the respective debug circuits in the debugging function circuit section 220 of the operand information through an operand information notification signal line 229.

In this case, the watch point circuit 221, the trace circuit 222, the timer circuit 223, the trigger circuit 224 and the cache information circuit 225 incorporated into the debug extension circuit section 210 are selected from among a plurality of circuits, according to the respective functions. That is to say, a program developer selects functions necessary for debugging a target program during the development of a semiconductor integrated circuit device (LSI).

All the circuits 221 through 225 are connected to the address-information receiving section 236 via the address information notification signal line 228 and also connected to the operand-information receiving section 237 via the operand information notification signal line 229. However, one or more of the circuits 221 through 225 may not be connected to the address-information receiving section 236 or the operand-information receiving section 237 in some debugging situations.

FIGS. 5A through 5E show examples of debug circuits with respective functions available in the semiconductor integrated circuit device of the first embodiment. FIGS. 5A through 5E schematically show the scale of circuits A, B and C in descending order.

Figure 5A:
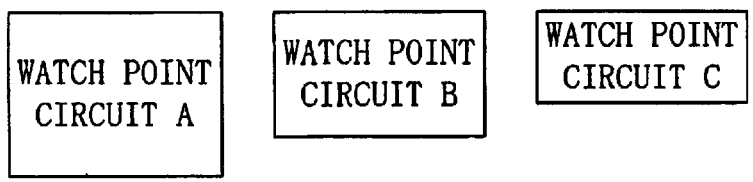
FIGS. 5A through 5E show examples of debug circuits with respective functions available for the semiconductor integrated circuit device of the first embodiment.

FIG. 5A shows an example of the watch point circuit 221 incorporable into the debug extension circuit section 210 in the second semiconductor chip 200. The circuits A through C have mutually different circuit scales and configurations depending on the number of watch points capable of being set or the types of the watch points.

Figure 5B:
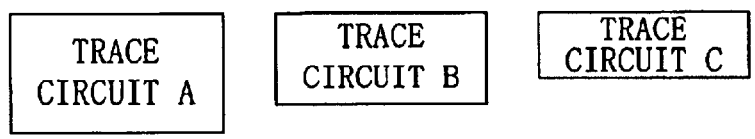

FIG. 5B shows an example of the trace circuit 222 incorporable into the debug extension circuit section 210. The circuits A through C have mutually different circuit scales and configurations depending on the number of traces capable of being set or the types of the traces.

Figure 5C:
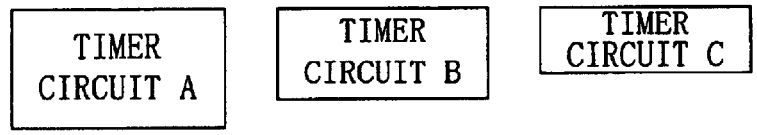
Figure 5D:
Figure 5E:
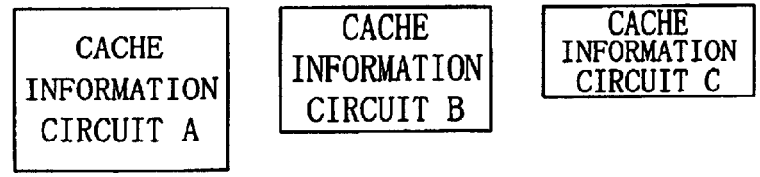

In the same way, FIG. 5C shows an example of the timer circuit 223 incorporable into the debug extension circuit section 210. The circuits A through C have mutually different circuit scales and configurations depending on the number of timers capable of being set or the types of the timers. FIG. 5D shows an example of the trigger circuit 224 incorporable into the debug extension circuit section 210. The circuits A through C have mutually different circuit scales and configurations depending on the number of triggers capable of being set or the types of the triggers. FIG. 5E shows an example of the cache circuit 225 incorporable into the debug extension circuit section 210. The circuits A through C have mutually different circuit scales and configurations depending on the number of caches capable of being set or the types of the caches.

FIG. 6 is a table showing combinations of debug circuits incorporable into the debugging function circuit 220, based on the FIGS. 5A through 5E. As described above, the program developer selects debug circuits each having a single function to make an appropriate combination, from among combinations that the developer wants to incorporate into the debugging function circuit 220 in the development of the LSI. The selected debug circuits are registered in the debug incorporating circuit identifying section 235 in the debug extension circuit section 210.

As described above, there provided a lot of types of debug circuits for use in verifying operation of a program, and each of the debug circuits has a single function. The present invention was made, focusing this aspect. Thus, as shown in FIGS. 5A through 5E, two or more types of debug circuits which have mutually independent single functions and have mutually different circuit scales and configurations are prepared, and at least one debug circuit appropriate for debugging a program to be developed is selected from among the debug circuits, thus improving the efficiency of the debugging.

In addition, the debugging function circuit 220 is formed in the discrete second semiconductor chip 200, which is retained over the first semiconductor chip 100 equipped with the CPU 110. Accordingly, even if all the debug circuits necessary for respective debugging processes are incorporated therein, the circuit scale on the first semiconductor chip 100 do not increase.

Further, the debug basic circuit section 160 is provided with the debug-extension-circuit-section-setting-information transmitting section 175 exclusively for transmission, and the debug extension circuit section 210 is provided with the setting-information receiving section 231 exclusively for reception. Accordingly, one set of signal lines is enough to connect the respective debug circuits such as the watch point circuit 221 constituting the debugging function circuit section 220 in the debug extension circuit section 210. That is to say, the number of signal lines is reduced. Therefore, the reduction of the number of signal lines makes it easy to establish electrical connection between the first and second semiconductor chips 100 and 200 in the process step of bonding the second semiconductor chip 200 onto the first semiconductor chip 100, thus allowing the chips to be bonded with high accuracy. As a result, the reliability of operation in the semiconductor integrated circuit device improves.

In the first embodiment, the watch point circuit 221, the trace circuit 222, the timer circuit 223, the trigger circuit 224 and the cache information circuit 225 are used as debugging functions incorporated into the debugging function circuit section 220 in the debug extension circuit section 210. However, it is sufficient to select the debugging functions from among the combinations shown in the table of FIG. 6.

Hereinafter, a debugger device for verifying operation of a program in the semiconductor integrated circuit device of the first embodiment will be described.

FIG. 7 is a block diagram showing a configuration of a debugger device according to the first embodiment. As shown in FIG. 7, the debugger device includes a host computer 300 which is a personal computer, for example, and is provided with a display 301 as an output device and a keyboard 302 as an input device. The host computer 300 is equipped with a debugger 310 which is software for verifying (debugging) operation of a program to be debugged executed by the CPU 110 installed into the semiconductor integrated circuit device shown in FIG. 1.

The debugger 310 includes: a debugger display section 320 for outputting debugging information on a program to be debugged to the display 301; a debugger body section 330 for managing a set debug command, execution control of the program executed by the CPU 110, and acquiring and setting of program information; and a debugger communication section 340 for transmitting a command input to the debugger 310 from, for example, the keyboard 302 to the debug basic circuit section 160 incorporated into the first semiconductor chip 100 as a target of debugging through the debugger instruction notification signal line 163, and for receiving an execution result thereof.

The debugger body section 330 includes: an incorporated debugging-function managing section 331 for holding debugging function information, which is incorporated into the debug extension circuit section 210 in the second semiconductor chip 200 as a target of debugging; and a debugger body initializing section 332 for initializing the debugger body section 310 based on the debugging function information held in the incorporated debugging-function managing section 331 so that a debugging function incorporated into the debug extension circuit section 210 as a target of development can be utilized.

In the debugger device of the first embodiment, even if the debugging function circuit 220 incorporated into the debug extension circuit section 210 is altered in every semiconductor integrated circuit device to be debugged, a desired debugging function can be selected.

In addition, the second semiconductor chip 200 provided with the debug extension circuit section 210 is disposed over the CPU 110 and the debug basic circuit section 160 formed in the first semiconductor chip 100 such that the second semiconductor chip 200 bridges the CPU 110 and the debug basic circuit section 160. Therefore, the electric wiring lengths between the CPU 110 and the debug extension circuit section 210 and between the debug basic circuit section 160 and the debug extension circuit section 210 can be shortened. As a result, the debugging function circuit 220 exhibits an extremely quick response so that the debugger 310 operates with stability.

Hereinafter, initialization of the debugger device of the first embodiment will be described.

Figure 8:
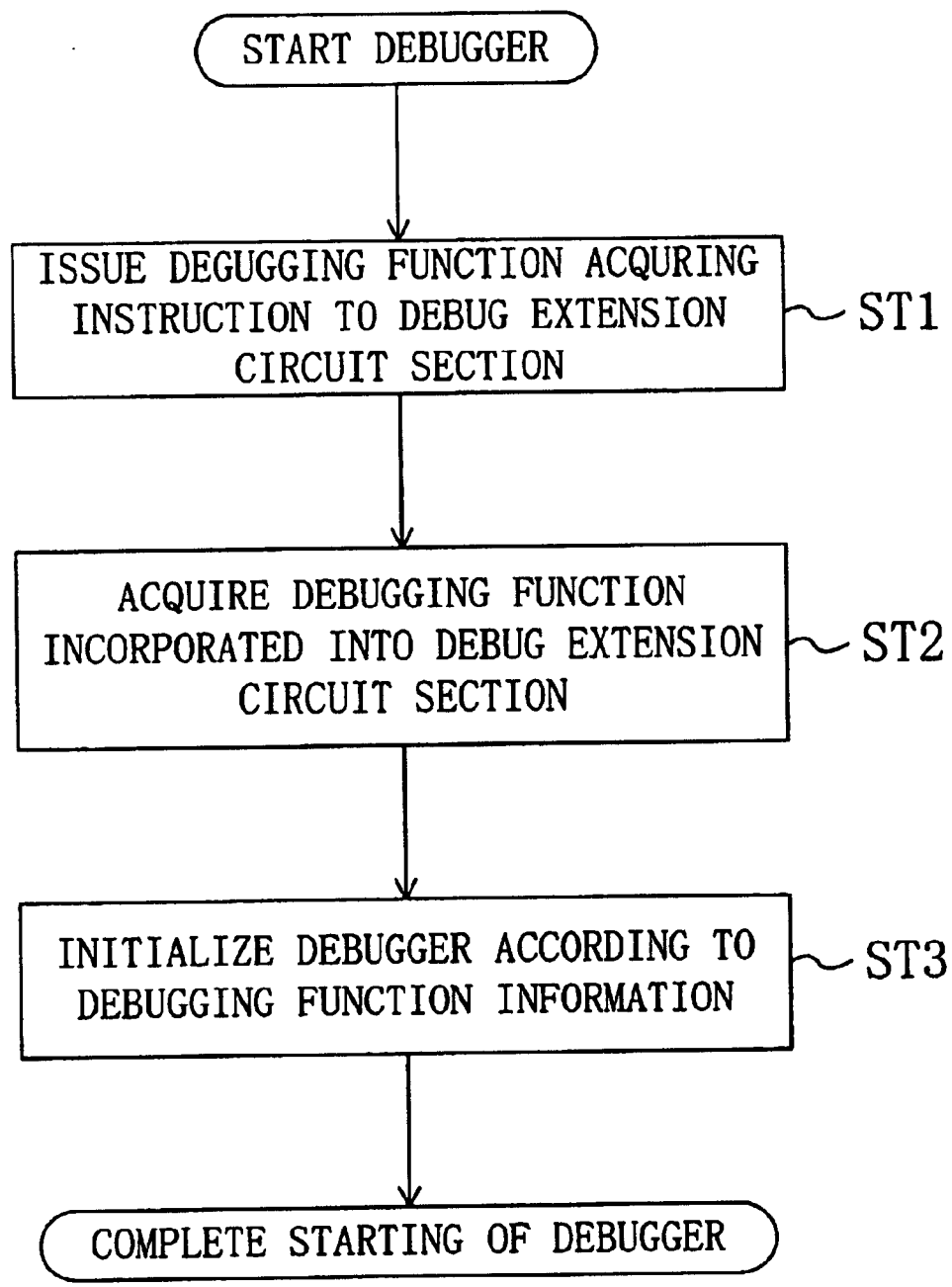
FIG. 8 is a flowchart showing initialization of the debugger device of the first embodiment.

FIG. 8 is a flowchart showing an example of initialization of the debugger device of the first embodiment. Now, the initialization of the debugger device is described with reference to FIGS. 2, 3, 4, 7 and 8.

First, when the debugger 310 is started, in the first step ST1, the incorporated debugging-function managing section 331 issues, to the second semiconductor chip 200, a debugging function acquiring instruction for acquiring identification information on a debug circuit held in the debug incorporating circuit identifying section 235 in the debug extension circuit section 210 formed in the second semiconductor chip 200.

Next, in the second step ST2, the issued debugging function acquiring instruction is received by the communication section 171 in the debug basic circuit section 160 formed in the first semiconductor chip 100 through the debugger instruction notification signal line 163, and is then analyzed by the debug-instruction analyzing section 172. Since the analyzed instruction is an instruction to the debug extension circuit section 210, the instruction is transmitted from the debug-extension-circuit-section-setting-information transmitting section 175 to the debug extension circuit section 210 in the second semiconductor chip 200 via the notification signal line 164. Subsequently, the setting-information receiving section 231 included in the debug extension circuit section 210 receives the instruction transmitted from the debug-extension-circuit-section-setting-information transmitting section 175 and reads out the identification information held in the debug incorporating circuit identifying section 235. Thereafter, the identification information that has been read out is transmitted from the result transmitting section 234 to the debug basic circuit section 160 in the first semiconductor chip 100 through the reception signal line 165. Then, the debug-extension-circuit-section-result receiving section 176 in the debug basic circuit section 160 receives the identification information, which is an execution result, from the debug extension circuit section 210. Thereafter, the received identification information is transmitted from the communication section 171 to the incorporated debugging-function managing section 331 in the debugger body section 330 through the debugger instruction notification signal line 163.

Then, in the third step ST3, the debugger body initializing section 332 in the debugger body section 330 initializes a debugging function capable of being used by the debugger device, based on the received identification information.

In this manner, in the first embodiment, the debug extension circuit section 210 is formed in the second semiconductor chip 200 constituting the semiconductor integrated circuit device equipped with a program to be debugged, and holds identification information for identifying one or more debug circuits selectively incorporated into the debug extension circuit section 210.

As described above, upon startup of the debugger 310, the debugger device of the first embodiment acquires identification information for identifying a debugging function from the semiconductor integrated circuit device to be debugged and initializes the debugger body section 330 based on the acquired identification information. Accordingly, even if the incorporated debugging function circuit section 220 is altered, a debugging environment can be easily established in accordance with the semiconductor integrated circuit device to be debugged, as intended.

Embodiment 2

Hereinafter, a second embodiment of the present invention will be described with reference to the drawings.

FIG. 9A is a plan view showing portion of a semiconductor integrated circuit device according to the second embodiment including a CPU, a debug basic circuit section and a second semiconductor chip. FIG. 9B shows a cross-sectional structure of the portion. In FIGS. 9A and 9B, each component also shown in FIGS. 2A and 2B is identified by the same reference numeral and the description thereof will be omitted herein.

The second embodiment is different from the first embodiment in that the second semiconductor chip 200 is constituted by a field programmable gate array (FPGA) 410, which is a rewritable hardware circuit.

In view of this, an FPGA circuit setting signal line 168 is provided between a debug basic circuit section 160 incorporated into a first semiconductor chip 100 and the FPGA 410 so as to transfer circuit information from a debugger in a host computer to the FPGA 410.

Figure 10:
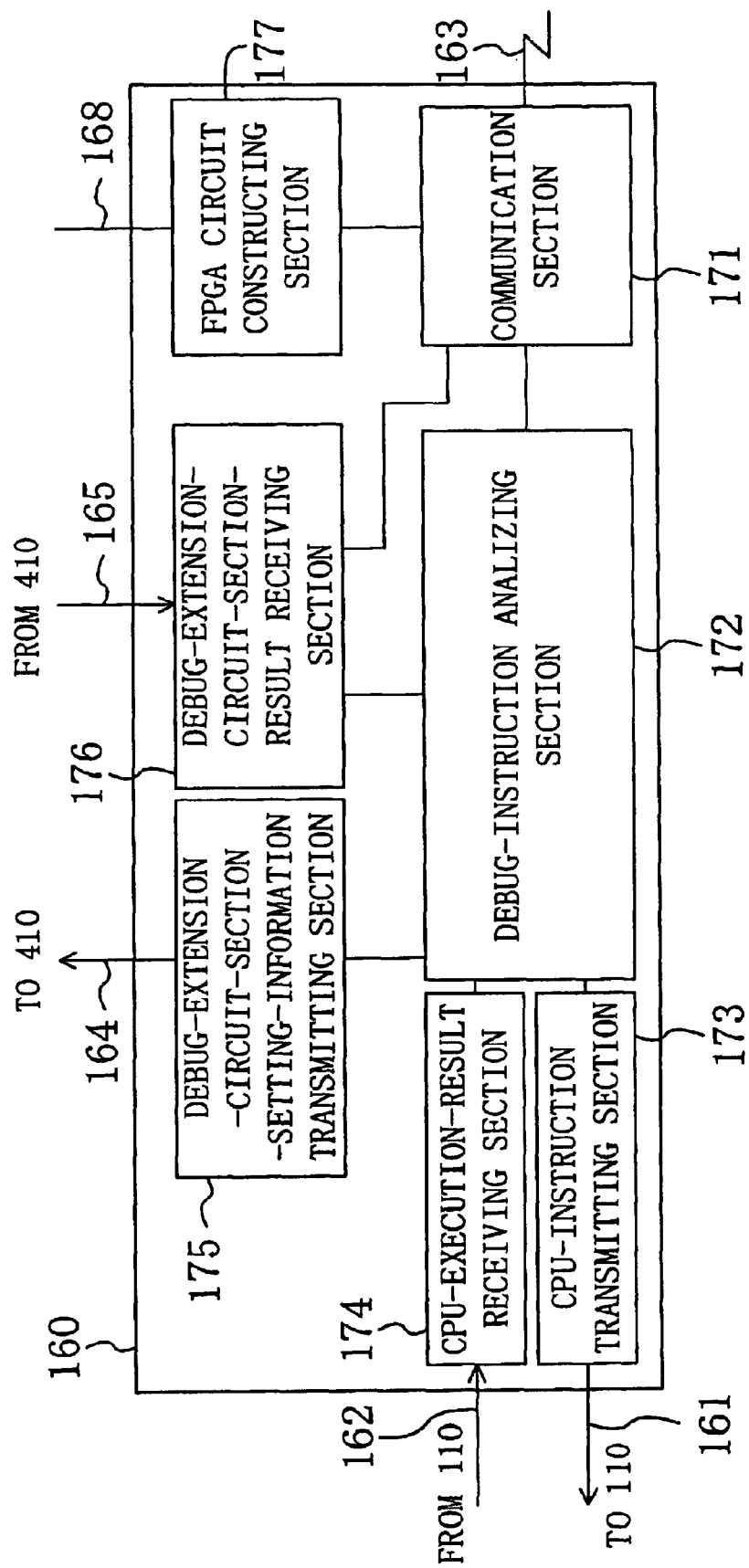
FIG. 10 is a block circuit diagram showing an example of a debug basic circuit section in the semiconductor integrated circuit device of the second embodiment.

FIG. 10 shows an example of a detailed configuration of the debug basic circuit section 160 according to the second embodiment. In FIG. 10, each component also shown in FIG. 3 is identified by the same reference numeral and the description thereof will be omitted herein.

As shown in FIG. 10, the debug basic circuit section 160 is provided with an FPGA circuit constructing section 177 for constructing a debugging function circuit in the FPGA 410.

When a write request is transmitted from the debugger in the host computer to the FPGA 410 through a debugger instruction notification signal line 163, the FPGA circuit constructing section 177 constructs a debugging function circuit in the FPGA 410 through the FPGA circuit setting signal line 168, based on circuit data on the FPGA transmitted from the debugger.

FIGS. 11A through 11E show examples of debug circuits available for the semiconductor integrated circuit device of the second embodiment. FIGS. 11A through 11E schematically show the scale of circuits a, b and c in descending order.

Figure 11A:
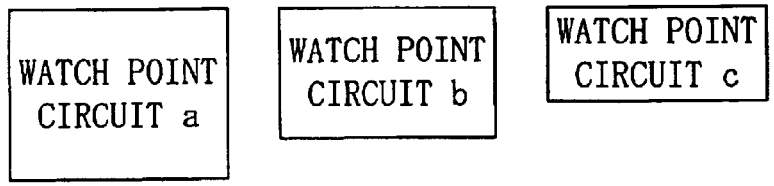
FIGS. 11A through 11E show examples of debug circuits with respective functions available for the semiconductor integrated circuit device of the second embodiment.

FIG. 11A shows an example of watch point circuits capable of being constructed in the FPGA 410 in the second semiconductor chip 200. The circuits a through c have mutually different circuit scales and configurations depending on the number of watch points capable of being set or the types of the watch points.

Figure 11B:
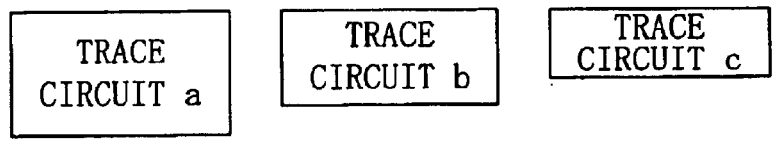
Figure 11C:
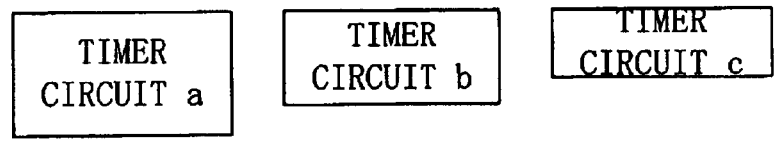
Figure 11D:
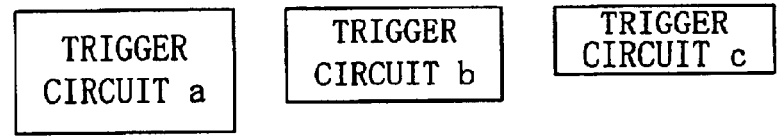
Figure 11E:
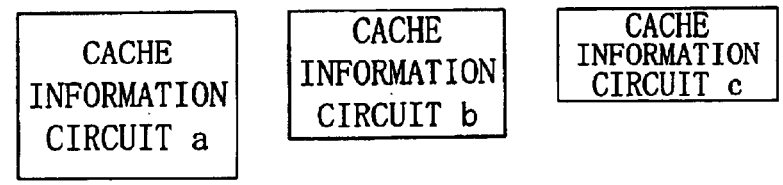

In the same way, FIG. 11B shows an example of trace circuits capable of being constructed in the FPGA 410. The circuits a through c have mutually different circuit scales and configurations depending on the number of traces capable of being set or the types of the traces. FIG. 11C shows an example of timer circuits capable of being constructed in the FPGA 410. The circuits a through c have mutually different circuit scales and configurations depending on the number of timers capable of being set or the types of the timers. FIG. 11D shows an example of trigger circuits capable of being constructed in the FPGA 410. The circuits a through c have mutually different circuit scales and configurations depending on the number of triggers capable of being set or the types of the triggers. FIG. 11E shows an example of cache circuits capable of being constructed in the FPGA 410. The circuits a through c have mutually different circuit scales and configurations depending on the types of caches capable of being set.

These debug circuits are previously registered in the host computer so that the debug circuits are selected in accordance with debugging processes.

In the second embodiment, upon startup of a debugger 310 incorporated into a host computer 300, circuit data is created so that the selected debug circuits are constructed FPGA 410, and the circuit data is transferred through the debugger instruction notification signal line 163, thereby constructing a selected debugging function circuit in the FPGA 410.

Hereinafter, a debugger device for verifying operation of a program in the semiconductor integrated circuit device of the second embodiment will be described.

Figure 12:
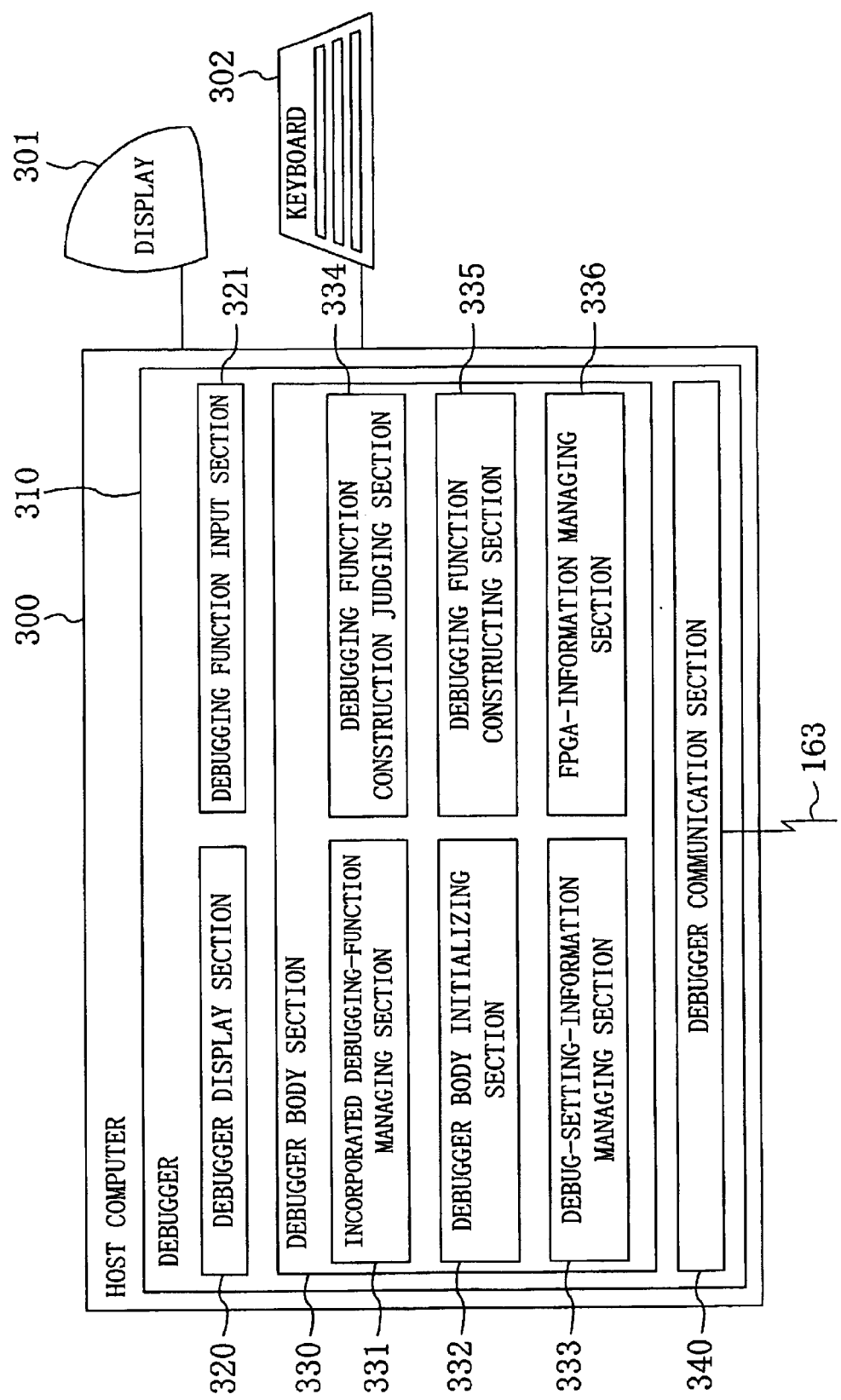
FIG. 12 is a block diagram showing a debugger device according to the second embodiment.

FIG. 12 shows a block diagram showing a configuration of the debugger device according to the second embodiment. In FIG. 12, each component also shown in FIG. 7 is identified by the same reference numeral and the description thereof will be omitted herein.

As shown in FIG. 12, the debugger device of the second embodiment includes, in the debugger 310, a debugging function inputting section 321 for selecting a desired debug circuit from among a plurality of debug circuit each having a single function as shown in FIGS. 11A through 11E, for example.

The debugger 310 has a debugger body section 330 including: a debug-setting-information managing section 333 for holding debugging information on a program to be debugged; a debugging function construction judging section 334 for judging whether or not a debug circuit selected by the debugging function inputting section 321 can be constructed in the target FPGA 410; a debugging function constructing section 335 for constructing a debug circuit, which has been judged to be constructible by the debugging function construction judging section 334, by creating circuit data available in the FPGA 410 on the debug circuit and transmitting the data to the semiconductor integrated circuit device; and an FPGA-information managing section 336 for acquiring and holding FPGA information held in the FPGA 410, in addition to the configuration of the first embodiment.

In this manner, for the debugger 310 of the second embodiment, a program developer can select an optimum debugging environment in accordance with debugging processes in starting the debugger 310. Therefore, the efficiency in developing a program remarkably improves.

In addition, after a desired debug circuit has been selected, the debugger 310 judges whether or not the selected debug circuit can be actually constructed in the FPGA 410 and notifies the program developer of the result. Accordingly, the program developer can select a desired debugging function, while visually confirming it on a display 301.

Moreover, the debugger 310 is provided with the FPGA-information managing section 336 in its debugger body section 330. Accordingly, even if the hardware configuration of the FPGA 410 formed in the second semiconductor chip 200 is altered, it is possible to establish an optimum debugging environment without altering the debugger 310.

Hereinafter, initialization of the debugger device of the second embodiment will be described.

Figure 13:
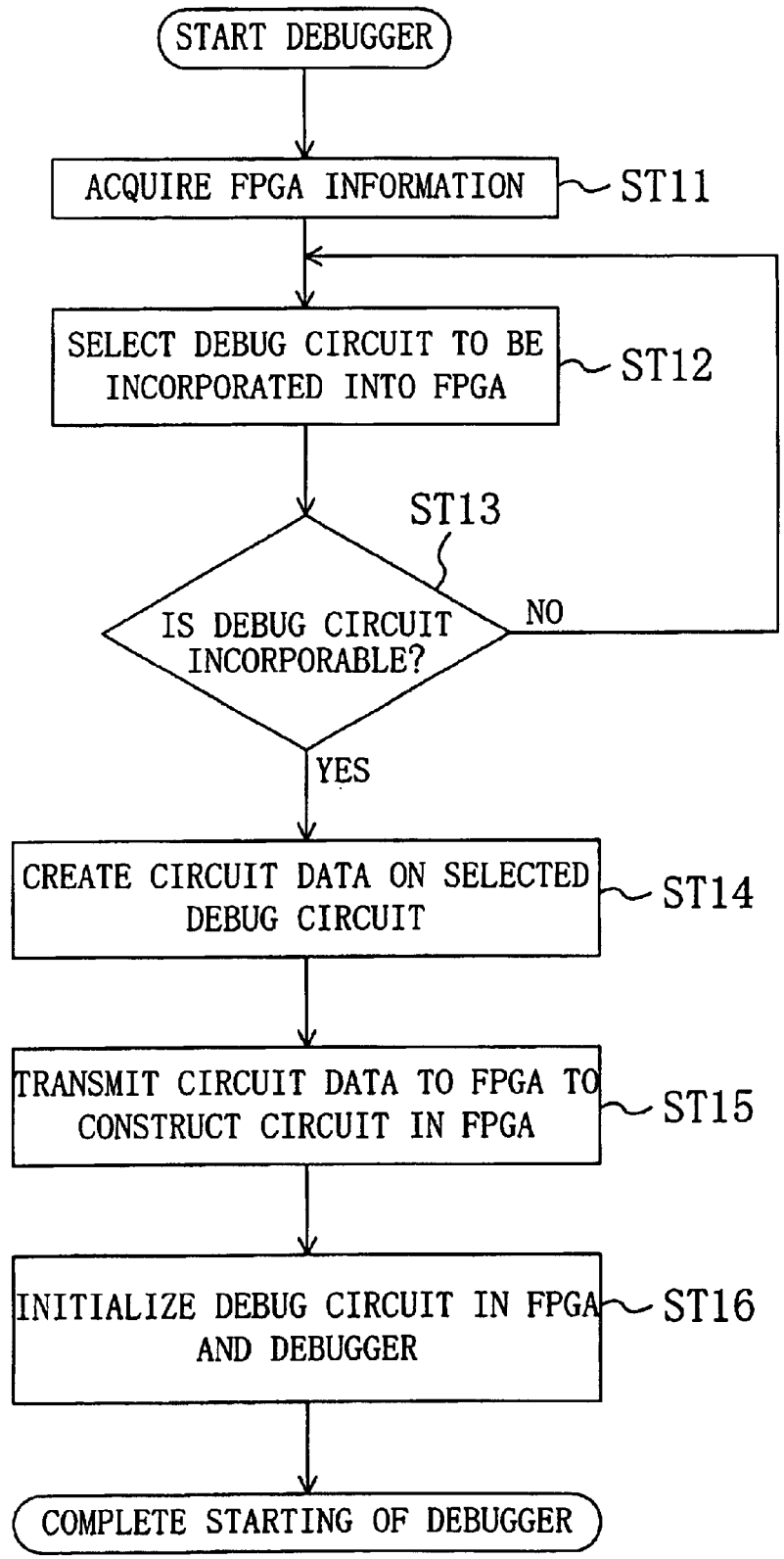
FIG. 13 is a flowchart showing initialization of the debugger device of the second embodiment.

FIG. 13 is a flowchart showing an example of initialization of the debugger device of the second embodiment. Now, the initialization of the debugger device is described with reference to FIGS. 9 through 13.

First, when the debugger 310 is started, in the first step ST11, an incorporated debugging-function managing section 331 acquires FPGA (hardware) information in the second semiconductor chip 200 as ID information held in the second semiconductor chip 200 from the second semiconductor chip 200, and holds the acquired information in the FPGA-information managing section 336. In this step, the debugger device itself may judge the FPGA information.

Next, in the second step ST12, a debugger display section 320 displays the list of previously registered debug circuits on the display 301 to call on the program developer to select a debug circuit. The program developer selects a debug circuit which the developer wants to incorporate into the FPGA 410. The selected debug circuit is input to the debugging function inputting section 321.

Then, in the third step ST13, the debugging function construction judging section 334 judges whether or not the selected debug circuit can be constructed in the FPGA 410, based on the acquired FPGA information, and displays the result of the judgment via the debugger display section 320 to notify the program developer of the result. In this step, when the selected debug circuit is judged to be unconstructible in the FPGA 410, the debugging function construction judging section 334 calls on the program developer to select another debug circuit.

Then, when the selected debug circuit is judged to be constructible in the FPGA 410, the debugging function constructing section 335 creates circuit data necessary for constructing the selected debug circuit in the FPGA 410, in the fourth step ST14.

Subsequently, in the fifth step ST15, the created circuit data is transmitted to the debug basic circuit section 160 of the semiconductor integrated circuit device through the debugger instruction notification signal line 163. The circuit data received by the debug basic circuit section 160 is sent to the FPGA circuit constructing section 177 and then transmitted to the FPGA 410 through the FPGA circuit setting signal line 168, thereby constructing the selected debug circuit in the FPGA 410.

Thereafter, in the sixth step ST16, the constructed debug circuit and the debugger 310 are respectively initialized. After completion of the initialization, the program developer operates the debugger 310 to start debugging of a program executed by the CPU 110.

Figure 14:
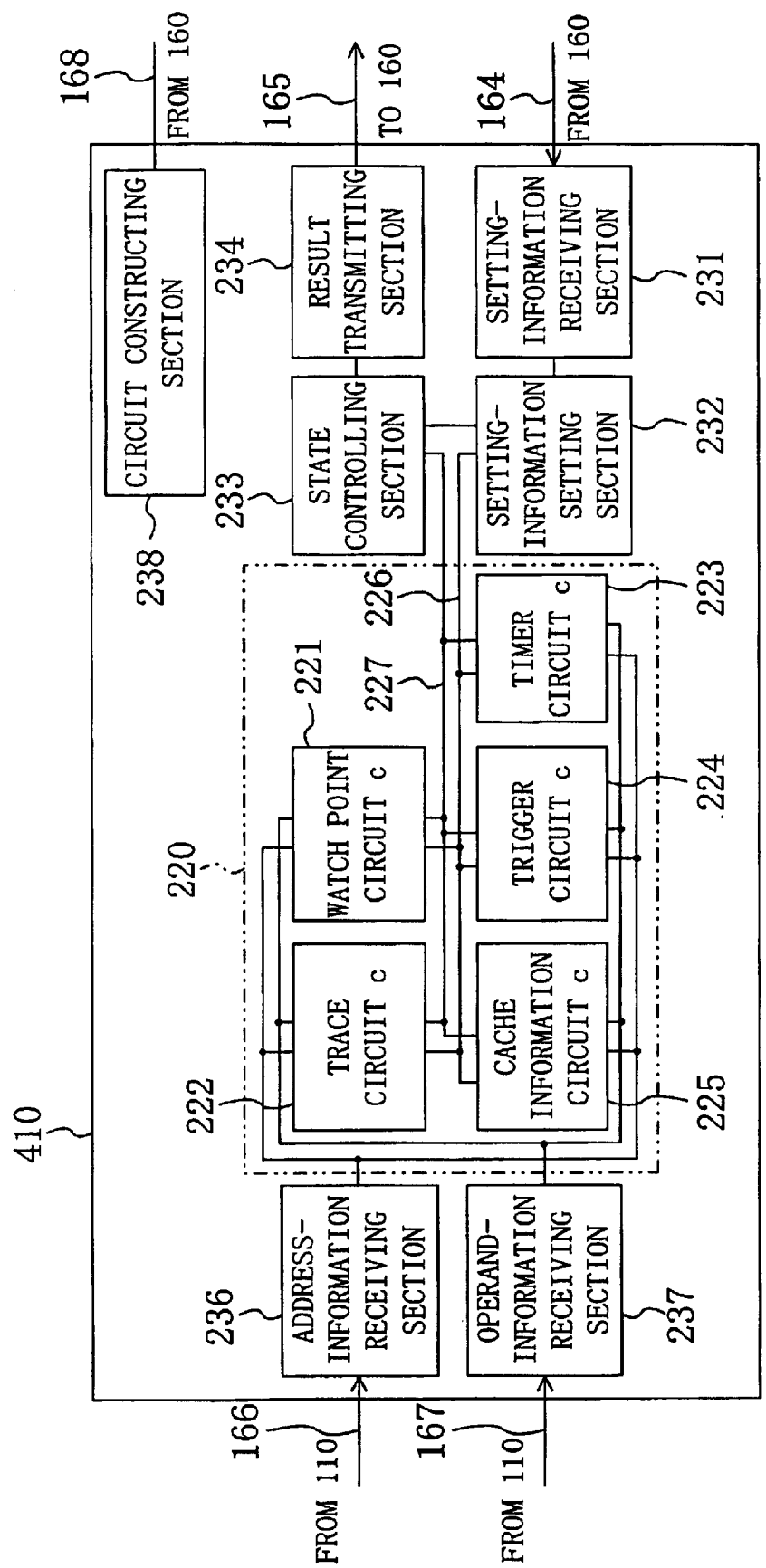
FIG. 14 is a block circuit diagram showing an example of an FPGA circuit in the semiconductor integrated circuit device of the second embodiment.

FIG. 14 shows an example of a circuit constructed based on circuit data created in the fourth step ST14. In FIG. 14, each component also shown in FIG. 4 is identified by the same reference numeral and the description thereof will be omitted herein.

As shown in FIG. 14, a debugging function circuit 220 in the FPGA 410 according to the second embodiment is configured by selecting the watch point circuit c, trace circuit c, timer circuit c, trigger circuit c and cache information circuit c, all of which have minimum circuit scales among the respective groups of debug circuits, from among the list of debug circuits shown in FIGS. 11A through 11E, for example.

The FPGA 410 is provided with a circuit constructing section 238 for receiving circuit data from the FPGA circuit constructing section 177 in the debug basic circuit section 160 formed in the first semiconductor chip 100.

In this manner, in the second embodiment, the first semiconductor chip 100 constituting the semiconductor integrated circuit device as a target of debugging and the second semiconductor chip 200 constituted by the FPGA 410 including a substantial debugging function of an incorporated debug circuit are provided, so that circuit data is downloaded from the debugger 310 to the FPGA 410, thereby forming the debugging function circuit section 220 in the FPGA 410. As a result, the same debugging environment as in the first embodiment can be established as well as an optimum debugging environment can be selected and realized in accordance with processes of development of a program.

It should be noted that the debug incorporating circuit identifying section 235 formed in the debug extension circuit section 210 according to the first embodiment may be omitted in the second embodiment because a debug circuit capable of being constructed is identified when the debugger 310 creates circuit data for the FPGA 410.

In addition, in the second embodiment, the program developer selects a debug circuit and then the selected debug circuit is constructed by creating data thereon. Alternatively, previously created circuit data may be prepared in the debugger 310, and if the circuit data is matched with data on a debug circuit selected by the program developer, the matched circuit data may be downloaded to the FPGA 410. Then, it is not necessary to newly create circuit data, so that the initialization of the debugger 310 is shortened, thus allowing the debugger 310 to be started more quickly.

Hereinafter, a method for reconstructing a debug circuit which has been constructed in an FPGA circuit while changing its debugging function even during debugging will be described.

Specifically, even after the debugging function circuit 220 in the semiconductor integrated circuit device has been constructed in the FPGA 410, the debugger device of the second embodiment can change the debugging function of the debugging function circuit 220.

Figure 15:
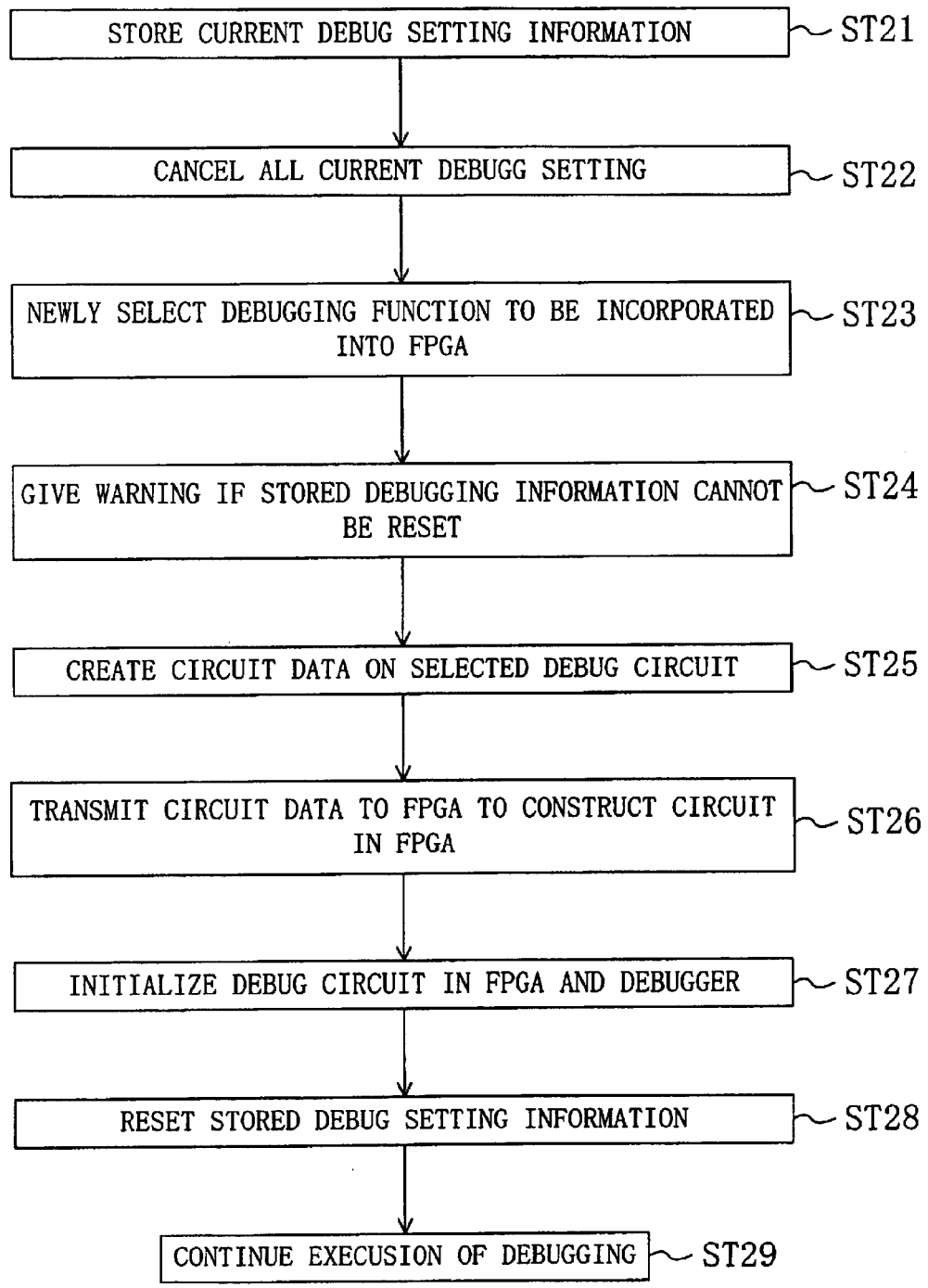
FIG. 15 is a flowchart showing the case where a debug circuit is changed while the debugger of the second embodiment verifies operation of a program.

FIG. 15 is a flowchart showing an example of operations in the case where a debug circuit is changed while the debugger 310 verifies operation of a program.

With reference to FIGS. 9 through 12 and FIG. 15, a procedure in changing the circuit configuration of the debugging function circuit 220 in the FPGA 410 is described.

First, as shown in FIG. 15, in the first step ST21, the program developer enters a command for changing the debugging function of the debugging function circuit 220 constructed in the FPGA 410, into the debugger 310. Subsequently, the debugger 310 that has received the command for changing the debugging function uploads, to the debug-setting-information managing section 333 in the debugger body section 330, setting information on the debug circuits 221 through 225 set in a setting-information setting section 232 in the FPGA 410 and the uploaded information is stored therein.

Next, in the second step ST22, when the storage of the setting information has been completed, the debug-setting-information managing section 333 cancels (erases) the setting information on the debug circuits 221 through 225 set in the FPGA 410.

Then, in the third step ST23, the debugger display section 320 displays the list of the registered debug circuits on the display 301, to call on the program developer to select a debug circuit. The program developer selects a debug circuit that the developer wants to newly incorporate into the FPGA 410. The selected debug circuit is input to the debugging function inputting section 321.

Thereafter, in the fourth step ST24, when the selected debug circuit is judged to be unconstructible in the FPGA 410, warning is made to call on the program developer to select another debug circuit.

Subsequently, when the selected debug circuit is judged to be constructible in the FPGA 410, the debugging function constructing section 335 creates circuit data necessary for constructing the selected debug circuit in the FPGA 410, in the fifth step ST25.

Then, in the step ST26, the created circuit data is transmitted to the debug basic circuit section 160 of the semiconductor integrated circuit device through the debugger instruction notification signal line 163. The circuit data received by the debug basic circuit section 160 is sent to the FPGA circuit constructing section 177 and then transmitted to the circuit constructing section 238 in the FPGA 410 through the FPGA circuit setting signal line 168, thereby constructing the selected debug circuit in the FPGA 410.

Thereafter, in the seventh step ST17, the constructed debug circuit and the debugger 310 are respectively initialized.

Then, in the step ST28, after completion of the initialization, part of setting information on the debug circuit held in the debug-setting-information managing section 333 in the debugger body section 330 which is effective in resetting is downloaded, and the downloaded information is reset to the debug circuit in the FPGA 410.

Thereafter, in the ninth step ST29, the program developer can restart debugging of a program executed by the CPU 110 using the reselected debugging function circuit 220.

As described above, it is possible to update a debug circuit into an optimum debug circuit in accordance with the state of debugging even during the debugging. Accordingly, debugging can be performed effectively.

In the second embodiment, debug setting information before the update of the debug circuit is reset to the updated debug circuit. However, the debug setting information is not necessarily reset to the update debug circuit.

Embodiment 3

Hereinafter, a third embodiment of the present invention will be described with reference to the drawings.

Figure 16:
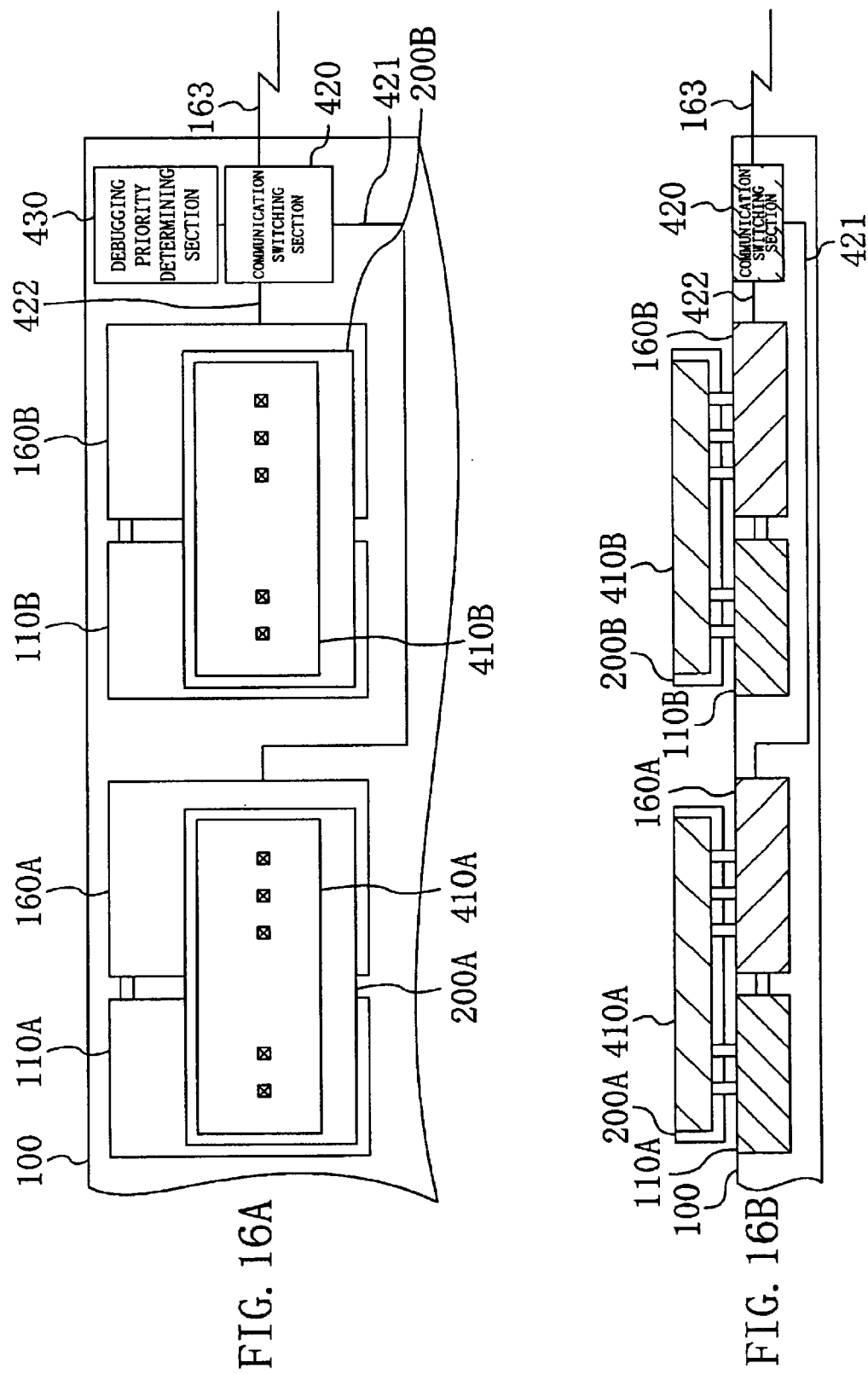
FIG. 16A is an enlarged plan view schematically showing a portion of a first semiconductor chip including a CPU and a debug basic circuit section, a second semiconductor chip and a third semiconductor chip in a semiconductor integrated circuit device according to a third embodiment of the present invention.
FIG. 16B is a cross-sectional view schematically showing the structure shown in FIG. 16A.

FIG. 16A is a plan view showing a portion of a semiconductor integrated circuit device according to the third embodiment including CPUs, debug basic circuit sections, a second semiconductor chip and a third semiconductor chip. FIG. 16B shows a cross-sectional structure of the portion. In FIGS. 16A and 16B, each component also shown in FIGS. 9A and 9B is identified by the same reference numeral and the description thereof will be omitted herein.

The third embodiment is different from the second embodiment in that a first CPU 110A and a second CPU 110B are formed in the first semiconductor chip 100 constituting the semiconductor integrated circuit device and that a second semiconductor chip 200A constituted by a first FPGA 410A and a third semiconductor chip 200B constituted by a second FPGA 410B are bonded onto the first CPU 110A and the second CPU 110B, respectively.

The first CPU 110A is connected to a first debug basic circuit section 160A formed in the first semiconductor chip 100 and to the first FPGA 410A via signal lines similar to those in the second embodiment. The second CPU 110B is connected to a second debug basic circuit section 160B formed in the first semiconductor chip 100 and to the second FPGA 410B via signal lines similar to those in the second embodiment.

In the third embodiment, a communication switching section 420 constituted by a selector, for example, is provided between the first and second debug basic circuit sections 160A and 160B and the debugger instruction notification signal line 163 in the first semiconductor chip 100. In this case, the first debug basic circuit section 160A and the communication switching section 420 are connected to each other via a first instruction notification signal line 421, and the second basic circuit section 160B and the communication switching section 420 are connected to each other via a second instruction notification signal line 422.

The first semiconductor chip 100 is provided with a debugging priority determinating section 430. The communication switching section 420 selectively connects one of CPUs registered in the first and second debug basic circuit sections 160A and 160B to the debugger instruction notification signal line 163.

Hereinafter, a debugger device for verifying operation of a program in the semiconductor integrated circuit device of the third embodiment will be described.

Figure 17:
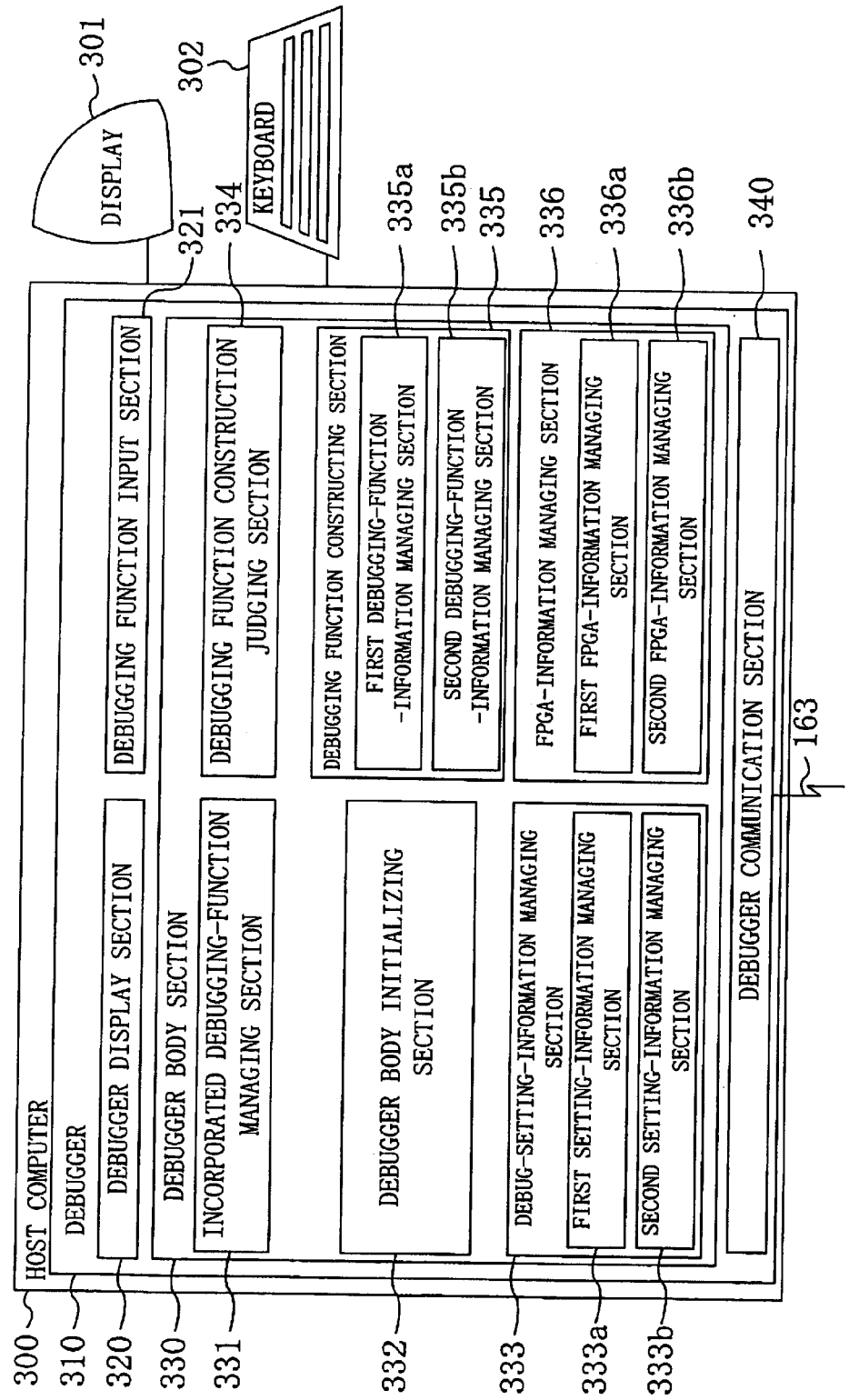
FIG. 17 is a block diagram showing a debugger device according to the third embodiment.

FIG. 17 is a block diagram showing a configuration of a debugger device according to the third embodiment. In FIG. 17, each component also shown in FIG. 12 is identified by the same reference numeral and the description thereof will be omitted herein.

As shown in FIG. 17, in the debugger device of the third embodiment, a debug-setting-information managing section 333 includes a first debug-setting-information managing section 333a and a second debug-setting-information managing section 333b and can hold debug setting information corresponding to the respective first and second CPUs 110A and 110B.

In addition, a debugging function constructing section 335 includes a first debugging-function-information managing section 335a and a second debugging-function-information managing section 335b associated with the respective CPUs, and an FPGA-information managing section 336 includes a first FPGA-information managing section 336a and a second FPGA-information managing section 336b corresponding to the respective CPUs.

In the third embodiment, when the debugger 310 is started on the host computer 300, the debugger 310 is connected to one of the CPUs which is determined as a target of debugging by the debugging priority determinating section 430 provided in the first semiconductor chip 100.

In this embodiment, as an example, an identifier representing the first CPU 110A is assumed to be registered in the debugging priority determinating section 430.

As described in the second embodiment, it is possible for a program developer to select a debugging function so as to perform initialized debugging operation after starting the debugger 310. In this case, information on the selected debug circuit is held in the first debugging-function-information managing section 335a in the debugging function constructing section 335. The first FPGA-information managing section 336a in the FPGA-information managing section 336 acquires and holds hardware information on the first FPGA 410A.

In the third embodiment, if a program executed by the second CPU 110B is to be debugged instead of a program executed by the first CPU 110A, data registered in the debugging priority determinating section 430 is changed into an identifier representing the second CPU 110B, so that the program executed by the second CPU 110B can be debugged. In this case, debug setting information set to debug a program being executed by the first CPU 110A is uploaded and held in the first debug-setting-information managing section 333a. It should be noted that part of or a whole of this debug setting information may be reset.

Information on the debug circuit selected for debugging the program executed by the second CPU 110B is held in the second debugging-function-information managing section 335a. Hardware information on the second FPGA 410B is uploaded and held in the second FPGA-information managing section 336b.

When the program executed by the first CPU 110A is to be debugged again instead of that executed by the second CPU 110B, the debugger 310 is reconstructed according to information on the first debugging-function-information managing section 335a and the first FPGA-information managing section 336a. Debug setting information held in the first debug-setting-information managing section 333a is downloaded and restored, allowing the program developer to debug the program executed by the first CPU 110A.

In this manner, in the third embodiment, even if the two CPUs 110A and 110B are provided in the first semiconductor chip 100, optimum debugging environments for the respective CPUs can be established.

In addition, one line, i.e., the debugger instruction notification signal line 163, functions as a communication line for debugging the program executed by the first CPU 110A as well as a communication line for debugging the program executed by the second CPU 110B. Accordingly, it is possible to reduce the number of terminals in the semiconductor integrated circuit device, e.g., a system LSI, resulting in reduced fabrication cost for the system LSI.

Moreover, the started debugger 310 is configured to debug a program executed by one of the CPUs. Accordingly, even if the CPU to be debugged is changed, debugging operation does not change.

In the third embodiment, two CPUs are embedded in the first semiconductor chip 100. However, the present invention is not limited to this specific embodiment. Even in a semiconductor integrated circuit device with three or more CPUs, if areas for holding data for the respective CPUs are secured in the debugger 310, programs executed by the CPUs can be debugged, as in the third embodiment.

In addition, in the third embodiment, the first and second debugging-function-information managing sections 335a and 335b serve as a part of the debugging function constructing section 335. However, these debugging-function-information managing sections 335a and 335b may serve as a function of the debugger body section 330.

In the third embodiment, the uploaded debug setting information acquired by the first and second debug-setting-information managing sections 333a and 333b in the debug-setting-information managing section 333 is reset in a debugging function circuit 220. However, the debug setting information already set is not necessarily reset.

In the third embodiment, the debugging function circuit 220 to be incorporated into each of the second and third semiconductor chips 200A and 200B is constructed as an FPGA which is a rewritable hardware circuit. Alternatively, as in the first embodiment, the debugging function circuit 220 may be constructed as a nonvolatile memory.

What is claimed is:

1. A semiconductor integrated circuit device comprising:
a first semiconductor chip including a memory section, input/output sections, a CPU core and a first debug circuit section for verifying operation of a program executed by the CPU core; and
a second semiconductor chip retained over a principal surface of the first semiconductor chip and including a second debug circuit section electrically connected to the CPU core and the first debug circuit section,
wherein the first debug circuit section includes a command analyzing section for analyzing a debug command input from outside, a first transmitting/receiving section for, if the analyzed command is a command to be executed by the CPU core, transmitting the command to the CPU core and receiving an execution result of the command from the CPU core, and a second transmitting/receiving section for, if the analyzed command is a command to be executed by the second debug circuit section, transmitting the command to the second debug circuit section and receiving an execution result of the command from the second debug circuit, and
the second debug circuit section includes a debugging function circuit.

2. The semiconductor integrated circuit device of claim 1, wherein the debugging function circuit includes at least one of a watch point circuit, a trace circuit, a timer circuit, a trigger circuit and a cache information circuit, and is configured by selecting said one circuit from a plurality of circuits having a single function and mutually differing in scale and configuration.

3. The semiconductor integrated circuit device of claim 1, wherein the debugging function circuit is a rewritable hardware circuit.

4. A semiconductor integrated circuit device, comprising:
a first semiconductor chip including a memory section, input/output sections, a first CPU core, a first debug circuit section for verifying operation of a program executed by the first CPU core, a second CPU core, and a second debug circuit section for verifying operation of a program executed by the second CPU core;
a second semiconductor chip retained over a principal surface of the first semiconductor chip and including a third debug circuit section electrically connected to the first CPU core and the first debug circuit section;
a third semiconductor chip retained over the principal surface of the first semiconductor chip and including a fourth debug circuit section electrically connected to the second CPU core and the second debug circuit section; and a command switching section for switching a debug command input from outside, between the first debug circuit section and the second debug circuit section, wherein the first debug circuit section includes a command analyzing section for analyzing the debug command input through the command switching section, a first transmitting/receiving section for, if the analyzed command is a command to be executed by the first CPU core, transmitting the command to the first CPU core and receiving an execution result of the command from the first CPU core, and a second transmitting/receiving section for, if the analyzed command is a command to be executed by the third debug circuit section, transmitting the command to the third debug circuit section and receiving an execution result of the command from the third debug circuit, the second debug circuit section includes a command analyzing section for analyzing the debug command input through the command switching section, a third transmitting/receiving section for, if the analyzed command is a command to be executed by the second CPU core, transmitting the command to the second CPU core and receiving an execution result of the command from the second CPU core, and a fourth transmitting/receiving section for, if the analyzed command is a command to be executed by the fourth debug circuit section, transmitting the command to the fourth debug circuit section and receiving an execution result of the command from the fourth debug circuit, and each of the third and fourth debug circuit sections includes a debugging function circuit.

5. The semiconductor integrated circuit device of claim 4, wherein the debugging function circuit includes at least one of a watch point circuit, a trace circuit, a timer circuit, a trigger circuit and a cache information circuit, and is configured by selecting said one circuit from a plurality of circuits having a single function and mutually differing in scale and configuration.

6. The semiconductor integrated circuit device of claim 4, wherein the debugging function circuit is a rewritable hardware circuit.

7. A debugger device issuing an instruction to first and second debug circuit sections in a semiconductor integrated circuit device which includes a first semiconductor chip including a memory section, input/output sections, a CPU core and the first debug circuit section and a second semiconductor chip retained over a principal surface of the first semiconductor chip and including the second debug circuit section, the first debug circuit section verifying operation of a program executed by the CPU core, the second debug circuit section being electrically connected to the CPU core and the first debug circuit section, the debugger device comprising:

an incorporated debugging-function managing section for identifying a debugging function held in the second debug circuit section; and a debugger body initializing section for initializing the debugger device based on the identified debugging function.

8. The debugger device of claim 7, wherein the second semiconductor chip in the semiconductor integrated circuit device includes a rewritable hardware circuit, the debugger device includes:

a hardware information managing section for managing information on the hardware circuit;

a debugging function construction judging section for judging at least one debugging function included in the hardware circuit whether or not said at least one debugging function is incorporable; and a debugging function constructing section for constructing, in the hardware circuit, a debugging function judged to be incorporable by the debugging function construction judging section.

9. The debugger device of claim 8, wherein the debugging function constructing section selects one circuit from among a plurality of hardware circuits created as circuit data beforehand.

10. The debugger device of claim 9, further including a debug-setting-information managing section for storing the debug information set in the hardware circuit, wherein the debug-setting-information managing section cancels the debugging information set in the hardware circuit and then resets, in the hardware circuit, the debugging information stored in the debug-setting-information managing section.

11. The debugger device of claim 8, wherein the debugging function constructing section includes a debugging function information managing section for holding a plurality of debugging functions, and the hardware information managing section holds a plurality of pieces of hardware circuit information.

* * * * *